US011916624B2

United States Patent
Sethi et al.

(10) Patent No.: US 11,916,624 B2
(45) Date of Patent: Feb. 27, 2024

(54) SYSTEM AND METHOD FOR ENABLING MULTI-USER MULTIPLE-INPUT-MULTIPLE-OUTPUT COMMUNICATION IN WIRELESS NETWORKS

(71) Applicant: NXP USA, Inc., Austin, TX (US)

(72) Inventors: Ankit Sethi, Pune (IN); Sayak Roy, Kolkata (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 71 days.

(21) Appl. No.: 17/644,487

(22) Filed: Dec. 15, 2021

(65) Prior Publication Data

US 2023/0188183 A1 Jun. 15, 2023

(51) Int. Cl.
*H04B 7/0452* (2017.01)
*H04W 74/08* (2009.01)
*H04W 72/04* (2023.01)
*H04W 72/044* (2023.01)

(52) U.S. Cl.
CPC ........ *H04B 7/0452* (2013.01); *H04W 72/046* (2013.01); *H04W 74/0816* (2013.01); *H04W 74/0866* (2013.01)

(58) Field of Classification Search
CPC ......... H04W 72/0453; H04W 74/0816; H04W 72/046; H04W 74/0866; H04W 28/20; H04B 7/0452
See application file for complete search history.

(56) References Cited

U.S. PATENT DOCUMENTS

| | | | |
|---|---|---|---|
| 6,252,909 B1 | 6/2001 | Tzannes et al. | |
| 11,044,056 B2* | 6/2021 | Liu | H04L 5/003 |
| 11,405,084 B1* | 8/2022 | Changlani | H04W 72/0453 |
| 2015/0117368 A1* | 4/2015 | Barriac | H04B 7/0452 |
| | | | 370/329 |
| 2016/0330715 A1* | 11/2016 | Chen | H04W 72/04 |
| 2016/0353322 A1* | 12/2016 | Li | H04L 5/0023 |

(Continued)

OTHER PUBLICATIONS

Khomyat et al, "Performance of MU-MIMO systems using HMRS technique for various transmission modes", 2013 10th International Conference on Electrical Engineering/Electronics, Computer, Telecommunications and Information Technology, May 15-17, 2013, IEEE, Krabi, Thailand, 5 pages.

*Primary Examiner* — Liton Miah

(57) ABSTRACT

A wireless network includes a networking device and various stations. The networking device determines an available bandwidth of each station of the wireless network. Further, the networking device assigns a bandwidth and at least one spatial stream to each station. The bandwidth assigned to each station is less than or equal to the available bandwidth of the corresponding station. Further, the bandwidth assigned to one station is different from and partially overlaps with the bandwidth assigned to another station. Similarly, the spatial stream assigned to one station is different from the spatial stream assigned to another station. The networking device generates a data packet indicative of the bandwidth and the spatial stream assigned to each station of the wireless network, and transmits the data packet to each station to enable multi-user multiple-input-multiple-output (MU-MIMO) communication between the networking device and the stations.

20 Claims, 13 Drawing Sheets

(56) References Cited

U.S. PATENT DOCUMENTS

2017/0048844 A1\* 2/2017 Chen ................. H04W 72/21
2017/0290045 A1\* 10/2017 Nair .................. H04W 74/085
2022/0361159 A1\* 11/2022 Changlani ............ H04B 7/0452

\* cited by examiner

SYSTEM AND METHOD FOR ENABLING MULTI-USER MULTIPLE-INPUT-MULTIPLE-OUTPUT COMMUNICATION IN WIRELESS NETWORKS

FIELD OF USE

The present disclosure relates generally to wireless communication, and, more particularly, to a method and a system for enabling multi-user multiple-input-multiple-output (MU-MIMO) communication in wireless networks.

BACKGROUND

A wireless network includes a networking device (e.g., an access point) and various stations (e.g., mobile devices) that are in communication with the networking device. Typically, the networking device communicates with (e.g., transfers data to) the stations in a sequential manner. In other words, single-user multiple-input-multiple-output (SU-MIMO) communication is enabled between the networking device and the stations. In such a scenario, an increase in the number of stations in the wireless network leads to congestion in the wireless network and decreases the speed of data communication between the networking device and each station.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
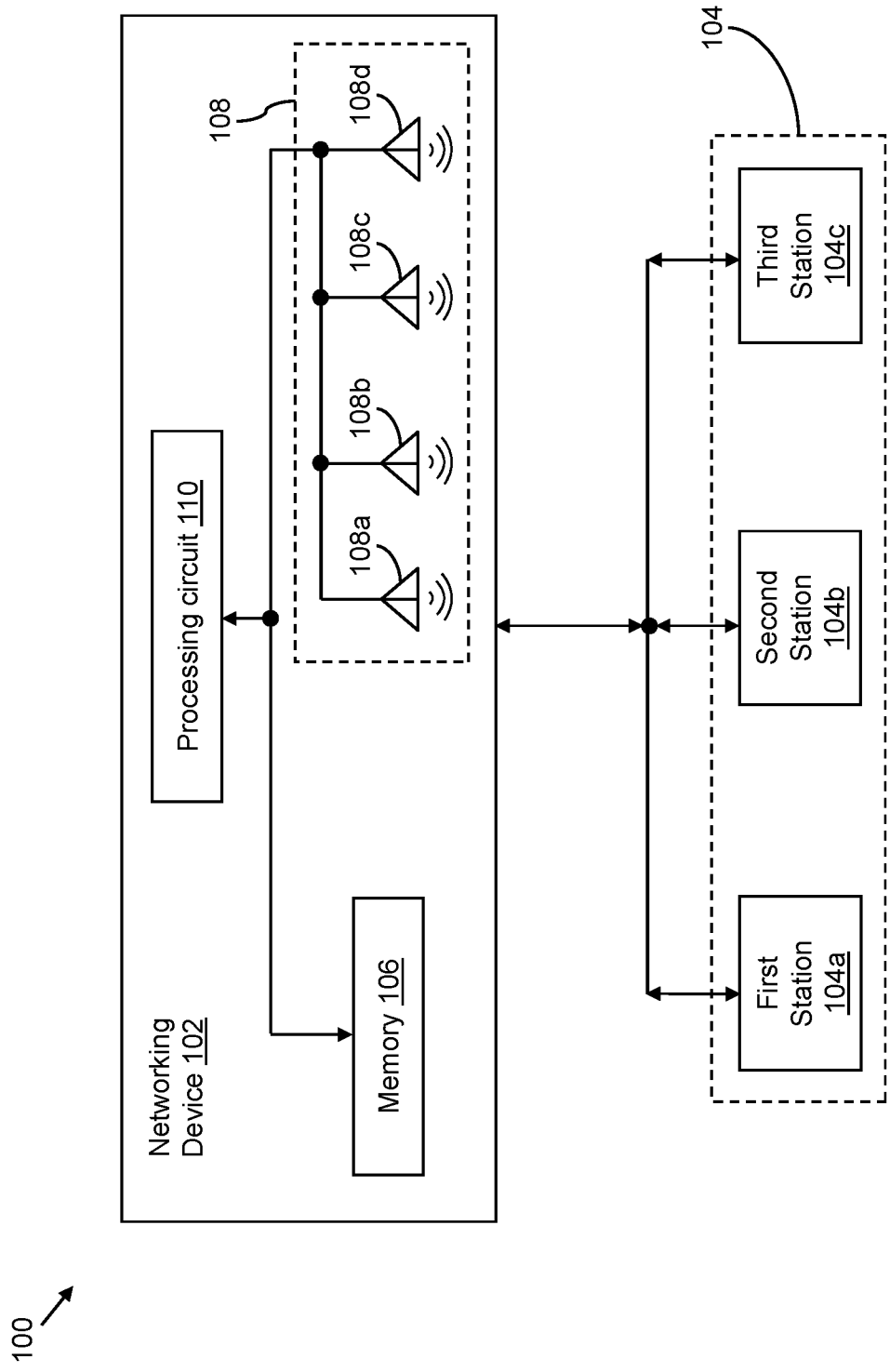
FIG. 1 illustrates a schematic block diagram of a wireless network in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment of the present disclosure, a networking device of a wireless network is disclosed. The networking device may include a processing circuit. The processing circuit may be configured to determine an available bandwidth of each station of a plurality of stations of the wireless network. The processing circuit may be further configured to assign a bandwidth and one or more spatial streams to each station of the plurality of stations. The bandwidth assigned to each station of the plurality of stations is less than or equal to the available bandwidth of the corresponding station. The bandwidth assigned to a first station of the plurality of stations is different from and partially overlaps with the bandwidth assigned to a second station of the plurality of stations. The one or more spatial streams assigned to the first station are different from the one or more spatial streams assigned to the second station. The processing circuit may be further configured to generate a data packet that is indicative of the bandwidth and the one or more spatial streams assigned to each station of the plurality of stations. Further, the processing circuit may be configured to transmit the data packet to the plurality of stations. Multi-user multiple-input-multiple-output (MU-MIMO) communication is enabled in the wireless network between the networking device and the plurality of stations based on the data packet.

In another embodiment of the present disclosure, a method for enabling MU-MIMO communication in a wireless network is disclosed. The method may include determining an available bandwidth of each station of a plurality of stations of the wireless network by a networking device of the wireless network. Further, the method may include assigning, for the MU-MIMO communication, a bandwidth and one or more spatial streams to each station of the plurality of stations by the networking device. The bandwidth assigned to each station of the plurality of stations is less than or equal to the available bandwidth of the corresponding station. The bandwidth assigned to a first station of the plurality of stations is different from and partially overlaps with the bandwidth assigned to a second station of the plurality of stations. The one or more spatial streams assigned to the first station are different from the one or more spatial streams assigned to the second station. The method may further include generating a data packet by the networking device. The data packet may be indicative of the bandwidth and the one or more spatial streams assigned to each station of the plurality of stations. Further, the method may include transmitting the data packet by the networking device to the plurality of stations. The MU-MIMO communication is enabled in the wireless network between the networking device and the plurality of stations based on the data packet.

In some embodiments, the networking device may further include a plurality of antennas. The plurality of antennas may be coupled to the processing circuit. The processing circuit may transmit the data packet to the plurality of stations using the plurality of antennas. Further, a number of spatial streams assigned to the plurality of stations is less than or equal to a number of antennas of the plurality of antennas.

In some embodiments, the bandwidth assigned to the first station and the bandwidth assigned to a third station of the plurality of stations are mutually exclusive. The one or more spatial streams assigned to the first station and the one or more spatial streams assigned to the third station are same.

In some embodiments, the bandwidth assigned to each station of the plurality of stations is less than or equal to an available bandwidth of the networking device.

In some embodiments, the bandwidth assigned to each station of the plurality of stations is contiguous.

In some embodiments, the bandwidth assigned to at least one station of the plurality of stations is non-contiguous.

In some embodiments, to determine the available bandwidth of the first station of the plurality of stations, the processing circuit may be further configured to generate and transmit a request-to-send (RTS) frame to the first station. A transmitter address field of the RTS frame is set to a predefined value and a data field of the RTS frame is indicative of an available bandwidth of the networking device. Further, the processing circuit may be configured to receive, from the first station, a clear-to-send (CTS) frame as a response to the RTS frame. The processing circuit may be further configured to determine whether a transmitter address field of the CTS frame is set to the predefined value. When the transmitter address field of the CTS frame is set to the predefined value, the processing circuit may be further configured to extract a data field of the CTS frame. The data field of the CTS frame is indicative of the available bandwidth of the first station.

In some embodiments, the RTS frame is one of a group consisting of a single-user RTS frame and a multi-user RTS frame.

In some embodiments, to determine the available bandwidth of the first station of the plurality of stations, the processing circuit may be further configured to generate a bandwidth query report poll (BQRP) trigger frame and transmit the BQRP trigger frame to the first station. Further, the processing circuit may be configured to receive, from the first station in response to the BQRP trigger frame, a channel quality report that is indicative of channel quality of each frequency band of a plurality of frequency bands between the first station and the networking device. An available bandwidth of the networking device is divided into the plurality of frequency bands. The processing circuit may be further configured to determine, for each frequency band of the plurality of frequency bands, whether the associated channel quality is greater than a threshold value. The available bandwidth of the first station corresponds to one or more frequency bands of the plurality of frequency bands having the channel quality greater than the threshold value.

In some embodiments, a frame format of the data packet corresponds to an extremely high throughput downlink orthogonal frequency division multiple access physical layer protocol data unit (EHT DL-OFDMA PPDU) frame format.

In some embodiments, an available bandwidth of the networking device is divided into a plurality of frequency bands. Each frequency band of the plurality of frequency bands is assigned to one or more stations of the plurality of stations.

In some embodiments, the data packet may include a plurality of data units associated with the plurality of frequency bands, respectively. Each data unit of the plurality of data units may include a first universal signal field and a second universal signal field. The first and second universal signal fields indicate that the corresponding data unit is a downlink orthogonal frequency division multiple access physical layer protocol data unit (DL-OFDMA PPDU).

In some embodiments, each data unit of the plurality of data units may further include an extremely high throughput (EHT) signal field. The EHT signal field may include a resource allocation subfield that is indicative of the bandwidth assigned to each station of the plurality of stations and a number of stations of the plurality of stations. The resource allocation subfield remains same for each data unit of the plurality of data units.

In some embodiments, each data unit of the plurality of data units may further include an extremely high throughput (EHT) signal field. The EHT signal field may include a spatial configuration subfield. The spatial configuration subfield of each data unit is indicative of the one or more spatial streams assigned to each station of the one or more stations in the corresponding frequency band.

In some embodiments, each data unit of the plurality of data units may further include a data field. The data field of each data unit may include a data set for the one or more stations in the corresponding frequency band.

Conventionally, to enable multi-user multiple-input-multiple-output (MU-MIMO) communication between a networking device and various stations of a wireless network, each station is required to have the same available bandwidth. If the available bandwidth of each station is different, exclusively the part of the available bandwidth that is same for each station is utilized for enabling the MU-MIMO communication. As a result, the throughput of the wireless network significantly degrades.

Various embodiments of the present disclosure disclose a wireless network. The wireless network may include a networking device and various stations. The networking device may determine an available bandwidth of each station of the wireless network. Further, the networking device may assign a bandwidth and at least one spatial stream to each station of the wireless network. The bandwidth assigned to each station is less than or equal to the available bandwidth of the corresponding station. Further, the bandwidth assigned to one station of the wireless network is different from and partially overlaps with the bandwidth assigned to another station of the wireless network. In such a scenario, the spatial stream assigned to one station of the wireless network is different from the spatial stream assigned to another station of the wireless network. The networking device may generate a data packet that is indicative of the bandwidth and the spatial stream assigned to each station of the wireless network. Further, the networking device may transmit the data packet to the stations.

The MU-MIMO communication is enabled between the networking device and the stations based on the data packet. In other words, the networking device communicates with the stations simultaneously, thereby increasing the speed of data communication between the networking device and each station. In the present disclosure, the bandwidth assigned to each station for the MU-MIMO communication is equal to the available bandwidth of the corresponding station, irrespective of other stations of the wireless network having different available bandwidths. Hence, the throughput of the wireless network of the present disclosure is significantly greater than that of a wireless network where some conventional techniques of enabling the MU-MIMO communication are implemented.

FIG. 1 illustrates a schematic block diagram of a wireless network 100 in accordance with an embodiment of the present disclosure. The wireless network 100 includes a networking device 102 and a plurality of stations 104 of which a first station 104a, a second station 104b, and a third station 104c, are shown. The wireless network 100 may correspond to a wireless local area network (WLAN), a worldwide interoperability for microwave access network, a network that complies with the Institute of Electrical and Electronics Engineers (IEEE) 802.11 standard, a cellular network, or the like. For the sake of ongoing discussion, it is assumed that the wireless network 100 corresponds to the WLAN.

The networking device 102 may correspond to an access point that may be coupled to the plurality of stations 104. The networking device 102 may include a memory 106, a plurality of antennas 108, and a processing circuit 110. Further, the networking device 102 may include a plurality of spatial streams (not shown) associated therewith. Data communicated between the networking device 102 and the plurality of stations 104 is carried over the plurality of spatial streams. Each spatial stream carries a predefined number of data packets. A number of spatial streams of the plurality of spatial streams is less than or equal to a number of antennas of the plurality of antennas 108. In an example, the number of antennas of the plurality of antennas 108 is four and the number of spatial streams of the plurality of spatial streams is three. However, the number of antennas and the number of spatial streams may have other values in other embodiments.

The networking device 102 may be configured to enable multi-user multiple-input-multiple-output (MU-MIMO) communication with the plurality of stations 104. In other words, a spatial multiplexing technique may be implemented by the networking device 102 to spatially multiplex streams to the plurality of stations 104 in an available bandwidth of the networking device 102. The available bandwidth of the networking device 102 is divided into a plurality of frequency bands. In an example, each frequency band of the plurality of frequency bands is equal to 20 megahertz (MHz). To enable the MU-MIMO communication between the networking device 102 and the plurality of stations 104, one or more frequency bands of the plurality of frequency bands and one or more spatial streams of the plurality of spatial streams are assigned to each station of the plurality of stations 104. The assigned one or more frequency bands may be contiguous or non-contiguous. Examples of the networking device 102 may include a wireless gateway, a cable modem, a wireless router, a mobile hot-spot router, a mobile phone having the capability to create a hot-spot, a wireless range extender, a multimedia over coaxial alliance (MoCA) node, or the like.

The memory 106 may be configured to store various instructions that when executed by the processing circuit 110, cause the processing circuit 110 to enable the MU-MIMO communication between the networking device 102 and the plurality of stations 104. The instructions stored in the memory 106 are pursuant to various standards and protocols (e.g., the IEEE 802.11 standard) set forth for wireless communication. Examples of the memory 106 may include a solid-state drive, a random-access memory, a read-only memory, a hard disk drive, a flash memory, a removable storage device, or the like.

The plurality of antennas 108 may be configured to wirelessly communicate with the plurality of stations 104. In an embodiment, the plurality of antennas 108 may include a first antenna 108a, a second antenna 108b, a third antenna 108c, and a fourth antenna 108d.

The processing circuit 110 may be coupled to the memory 106 and the plurality of antennas 108. Further, the processing circuit 110 may be coupled to the plurality of stations 104 by way of the plurality of antennas 108 and various channels between the networking device 102 and the plurality of stations 104. The processing circuit 110 may include suitable circuitry that may be configured to perform one or more operations. For example, the processing circuit 110 may be configured to enable the MU-MIMO communication between the networking device 102 and the plurality of stations 104.

To enable the MU-MIMO communication, the processing circuit 110 may be configured to determine an available bandwidth of each station of the first through third stations 104a-104c. The processing circuit 110 may determine the available bandwidth of each station of the first through third stations 104a-104c in numerous ways, two of which are described below.

One Way of Determining the Available Bandwidth of the Plurality of Stations 104:

The processing circuit 110 may be configured to generate a first request-to-send (RTS) frame for determining an available bandwidth of the first station 104a. Similarly, the processing circuit 110 may be further configured to generate a second RTS frame for determining an available bandwidth of the second station 104b and a third RTS frame for determining an available bandwidth of the third station 104c. The first through third RTS frames may be single-user RTS frames. The first through third RTS frames are shown later in FIGS. 7A and 7B. Each RTS frame includes a transmitter address field and a data field. The transmitter address field of each of the first through third RTS frames is set to a predefined value. When the transmitter address field is set to the predefined value, the corresponding data field is indicative of the available bandwidth of the device generating the RTS frame (e.g., the networking device 102). In other words, when the transmitter address fields of the first through third RTS frames are set to the predefined value, the data fields of the first through third RTS frames are indicative of the available bandwidth of the networking device 102. Further, the processing circuit 110 may be configured to transmit, using the plurality of antennas 108, the first through third RTS frames to the first through third stations 104a-104c, respectively.

The processing circuit 110 may be further configured to receive, using the plurality of antennas 108, a first clear-to-send (CTS) frame, a second CTS frame, and a third CTS frame from the first through third stations 104a-104c as responses to the first through third RTS frames, respectively. The first through third CTS frames are shown later in FIGS. 7A and 7B. Each CTS frame includes a transmitter address field and a data field. The processing circuit 110 may be further configured to determine whether the transmitter address field of each of the first through third CTS frames is set to the predefined value. When the transmitter address field of the first CTS frame is set to the predefined value, the data field of the first CTS frame is indicative of the available bandwidth of the first station 104a. Similarly, when the transmitter address field of the second CTS frame is set to the predefined value, the data field of the second CTS frame is indicative of the available bandwidth of the second station 104b. Further, when the transmitter address field of the third CTS frame is set to the predefined value, the data field of the third CTS frame is indicative of the available bandwidth of the third station 104c. For the sake of ongoing discussion, it is assumed that the transmitter address field of each of the first through third CTS frames is set to the predefined value.

The processing circuit 110 may be further configured to extract the data field of each of the first through third CTS frames when the transmitter address field of the corresponding CTS frame is set to the predefined value. The processing circuit 110 thus determines the available bandwidth of each of the first through third stations 104a-104c. The available bandwidth of each of the first through third stations 104a-104c may be different.

Another Way of Determining the Available Bandwidth of the Plurality of Stations 104:

The processing circuit 110 may be further configured to generate a first bandwidth query report poll (BQRP) trigger frame for determining the available bandwidth of the first station 104a. Similarly, the processing circuit 110 may be further configured to generate a second BQRP trigger frame for determining the available bandwidth of the second station 104b and a third BQRP trigger frame for determining the available bandwidth of the third station 104c. The first through third BQRP trigger frames are shown later in FIGS. 8A and 8B. Further, the processing circuit 110 may be configured to transmit, using the plurality of antennas 108, the first through third BQRP trigger frames to the first through third stations 104a-104c, respectively.

In response to the first BQRP trigger frame, the processing circuit 110 may be further configured to receive, using the plurality of antennas 108, a first channel quality report from the first station 104a. The first channel quality report is indicative of the channel quality of each frequency band of the plurality of frequency bands between the first station 104a and the networking device 102. For each frequency band of the plurality of frequency bands, the processing circuit 110 may be further configured to determine whether the associated channel quality is greater than a first threshold value. In such a scenario, the available bandwidth of the first station 104a corresponds to one or more frequency bands of the plurality of frequency bands having the channel quality greater than the first threshold value.

The processing circuit 110 may be similarly configured to receive, using the plurality of antennas 108, a second channel quality report and a third channel quality report from the second and third stations 104b and 104c in response to the second and third BQRP trigger frames, respectively. The first through third channel quality reports are shown later in FIGS. 8A and 8B. The second channel quality report is indicative of the channel quality of each frequency band of the plurality of frequency bands between the second station 104b and the networking device 102. Similarly, the third channel quality report is indicative of the channel quality of each frequency band of the plurality of frequency bands between the third station 104c and the networking device 102.

The processing circuit 110 may be further configured to determine, based on the second channel quality report, whether the channel quality of each frequency band of the plurality of frequency bands between the second station 104b and the networking device 102 is greater than a second threshold value. Similarly, based on the third channel quality report, the processing circuit 110 may be further configured to determine whether the channel quality of each frequency band of the plurality of frequency bands between the third station 104c and the networking device 102 is greater than a third threshold value. In such a scenario, the available bandwidth of the second station 104b and the available bandwidth of the third station 104c correspond to various bands of the plurality of frequency bands having the channel quality greater than the second and third threshold values, respectively. In an embodiment, the first through third threshold values are same. In another embodiment, the first through third threshold values are different. The processing circuit 110 thus determines the available bandwidth of each of the first through third stations 104a-104c. The available bandwidth of each of the first through third stations 104a-104c may be different.

Enabling the MU-MIMO Communication in the Wireless Network 100:

Based on the determined available bandwidth of each of the first through third stations 104a-104c, the processing circuit 110 may be further configured to assign, for the MU-MIMO communication, a bandwidth and one or more spatial streams to each station of the plurality of stations 104. In an example, a first bandwidth and a first spatial stream are assigned to the first station 104a, a second bandwidth and a second spatial stream are assigned to the second station 104b, and a third bandwidth and a third spatial stream are assigned to the third station 104c. The first bandwidth, the second bandwidth, the third bandwidth, the first spatial stream, the second spatial stream, and the third spatial stream are shown later in FIGS. 2, 3, 4, and 5.

The first bandwidth assigned to the first station 104a is less than or equal to the available bandwidth of the first station 104a. Similarly, the second bandwidth assigned to the second station 104b is less than or equal to the available bandwidth of the second station 104b, and the third bandwidth assigned to the third station 104c is less than or equal to the available bandwidth of the third station 104c. Further, the bandwidth assigned to each station of the plurality of stations 104 is less than or equal to the available bandwidth of the networking device 102.

The bandwidth assigned to each of the first through third stations 104a-104c is not same. In one example, the first bandwidth, the second bandwidth, and the third bandwidth assigned to the first through third stations 104a-104c are different. In such a scenario, if the first bandwidth, the second bandwidth, and the third bandwidth are different and partially overlap, the first through third spatial streams are different. In other words, a separate spatial stream is assigned to each of the first through third stations 104a-104c. Alternatively, if the first bandwidth and the second bandwidth are mutually exclusive and the third bandwidth is different from and partially overlaps with the first bandwidth and the second bandwidth, the first and second spatial streams are same and the third spatial stream is different from the first and second spatial streams. In other words, a spatial stream is shared between the first and second stations 104a and 104b, and a different spatial stream is assigned to the third station 104c. The assignment of the bandwidth and the spatial stream to each station of the plurality of stations 104 is explained further in conjunction with FIGS. 2, 3, 4, and 5.

The processing circuit 110 may be further configured to generate a data packet (shown later in FIG. 6) that is indicative of the bandwidth and the one or more spatial streams assigned to each station of the plurality of stations 104. The data packet may include various control fields that may indicate how the available bandwidth of the networking device 102 is assigned to the plurality of stations 104 to enable the MU-MIMO communication with the plurality of stations 104. The data packet may further include various data fields that may store various data sets that are to be communicated to the plurality of stations 104. The data packet is explained in detail in conjunction with FIG. 6.

The processing circuit 110 may be further configured to transmit, using the plurality of antennas 108, the data packet to the plurality of stations 104. The plurality of stations 104 may extract associated data sets from the data fields of the data packet based on the information stored in the control fields of the data packet. The MU-MIMO communication is thus enabled in the wireless network 100 between the networking device 102 and the plurality of stations 104 based on the data packet. Further, the networking device 102 may continue data communication with the plurality of stations 104 over the assigned bandwidths and the assigned spatial streams.

The wireless network 100 may include various other networking devices and stations, with each networking device associated with one or more stations. Each additional networking device may operate in a similar manner as the networking device 102.

The first through third stations 104a-104c may be coupled to the networking device 102. In an embodiment, each of the first through third stations 104a-104c includes one antenna (not shown). When the networking device 102 is determining the available bandwidth of the first through third stations 104a-104c, the first through third stations 104a-104c may be configured to receive the first through third RTS frames from the networking device 102, respectively. As responses to the first through third RTS frames, the first through third stations 104a-104c may be further configured to generate the first through third CTS frames and transmit the first through third CTS frames to the networking device 102, respectively. Alternatively, when the networking device 102 is determining the available bandwidth of the first through third stations 104a-104c, the first through third stations 104a-104c may be configured to receive the first through third BQRP trigger frames from the networking device 102, respectively. In such a scenario, the first through third stations 104a-104c may be further configured to generate the first through third channel quality reports as responses to the first through third BQRP trigger frames, respectively. Further, the first through third stations 104a-104c may be configured to transmit the first through third channel quality reports to the networking device 102, respectively.

The first through third stations 104a-104c may be further configured to receive the data packet from the networking device 102. Each station of the first through third stations 104a-104c may be further configured to identify, based on the data packet, the bandwidth and the one or more spatial streams that are assigned to the corresponding station. Each station may extract various control fields from the data packet to identify the bandwidth and the one or more spatial streams that are assigned to the corresponding station. Based on the information stored in the control fields, each station of the first through third stations 104a-104c may be further configured to extract associated one or more data sets from the data fields of the data packet. Thus, streams to the first through third stations 104a-104c are spatially multiplexed to facilitate data communication between the networking device 102 and the first through third stations 104a-104c. Examples of the first through third stations 104a-104c may include desktops, laptops, tablets, mobile devices, phablets, televisions, set-top boxes, or other Internet of things (IoT) based devices. Variations in the wireless network 100 of FIG. 1:

In a first variation, the wireless network 100 may correspond to a cellular network instead of a WLAN. In such a scenario, the networking device 102 may correspond to a base station instead of an access point.

In a second variation, the processing circuit 110 may generate a multi-user RTS frame instead of the first through third single-user RTS frames for determining the available bandwidth of each station of the plurality of stations 104. Further, the processing circuit 110 may be configured to transmit, using the plurality of antennas 108, the multi-user RTS frame to the first through third stations 104a-104c. As a response to the multi-user RTS frame, the processing circuit 110 may be further configured to receive a multi-user CTS frame.

In a third variation, the networking device 102 may be associated with another plurality of stations, in addition to the plurality of stations 104. In such a scenario, the available bandwidth of the networking device 102 may be split into two parts. One part of the available bandwidth may be utilized for spatially multiplexing streams to one plurality of stations (e.g., the plurality of stations 104) and another part of the available bandwidth may be utilized for spatially multiplexing streams to another plurality of stations.

In a fourth variation, the first station 104a may be assigned more than one spatial stream. Similarly, each of the second and third stations 104b and 104c may be assigned more than one spatial stream.

In a fifth variation, the available bandwidth of at least one station of the plurality of stations 104 may be greater than the available bandwidth of the networking device 102. In such a scenario, the bandwidth assigned to such a station is equal to the available bandwidth of the networking device 102.

Figure 2:
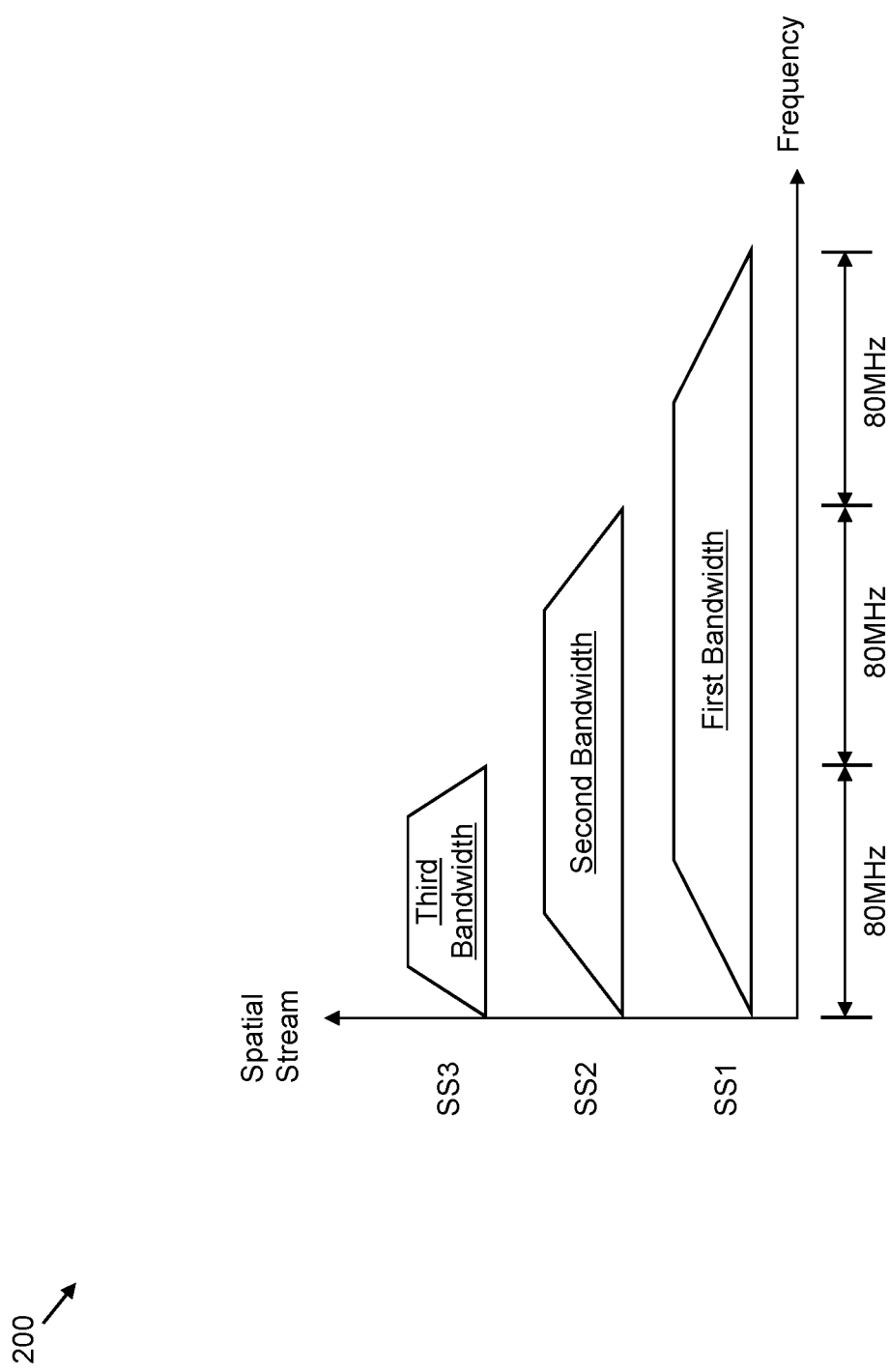
FIG. 2 is a pictorial representation of a bandwidth and one or more spatial streams assigned to each station of a plurality of stations of the wireless network of FIG. 1 for multi-user multiple-input-multiple-output (MU-MIMO) communication in accordance with an embodiment of the present disclosure.

FIG. 2 is a pictorial representation 200 of the bandwidth and the one or more spatial streams assigned to each station of the plurality of stations 104 for the MU-MIMO communication in accordance with an embodiment of the present disclosure. It is assumed that the available bandwidth of the networking device 102 is 240 MHz. Further, the available bandwidth of the first station 104a is 240 MHz, the available bandwidth of the second station 104b is 160 MHz, and the available bandwidth of the third station 104c is 80 MHz. In an example, the total serviceable bandwidth of the second and third stations 104b and 104c may be equal to 160 MHz and 80 MHz, respectively. In another example, the total serviceable bandwidth of the second and third stations 104b and 104c may be greater than 160 MHz and 80 MHz, respectively. In such a scenario, the second and third stations 104b and 104c may experience interference on the remaining frequency bands (e.g., overlap basic service set (OBSS) transmission may be in progress on the remaining frequency bands) thus rendering such frequency bands unavailable for the MU-MIMO communication.

As illustrated in FIG. 2, the first bandwidth assigned to the first station 104a is equal to 240 MHz (e.g., the entire available bandwidth of the first station 104a). Similarly, the second bandwidth assigned to the second station 104b is equal to 160 MHz and the third bandwidth assigned to the third station 104c is equal to 80 MHz. As the bandwidths assigned to the first through third stations 104a-104c are different and partially overlap, a separate spatial stream is assigned to each of the first through third stations 104a-104c. In other words, the first through third spatial streams are different and are illustrated as "SS1", "SS2", and "SS3"

in FIG. 2, respectively. Thus, a total of 480 MHz bandwidth is utilized for the MU-MIMO communication between the networking device 102 and the first through third stations 104a-104c.

As per some conventional MU-MIMO techniques, each of the first through third stations 104a-104c may be assigned the initial 80 MHz bandwidth, with the remaining available bandwidth of the first and second stations 104a and 104b not being utilized. This is because, in some conventional MU-MIMO techniques, streams to multiple stations can be spatially multiplexed exclusively using same bandwidth. In such a scenario, a total of 240 MHz bandwidth is utilized for the MU-MIMO communication between the networking device 102 and the first through third stations 104a-104c. Thus, the throughput of wireless network 100 is significantly greater than that of a wireless network implementing some conventional MU-MIMO techniques.

Figure 3:
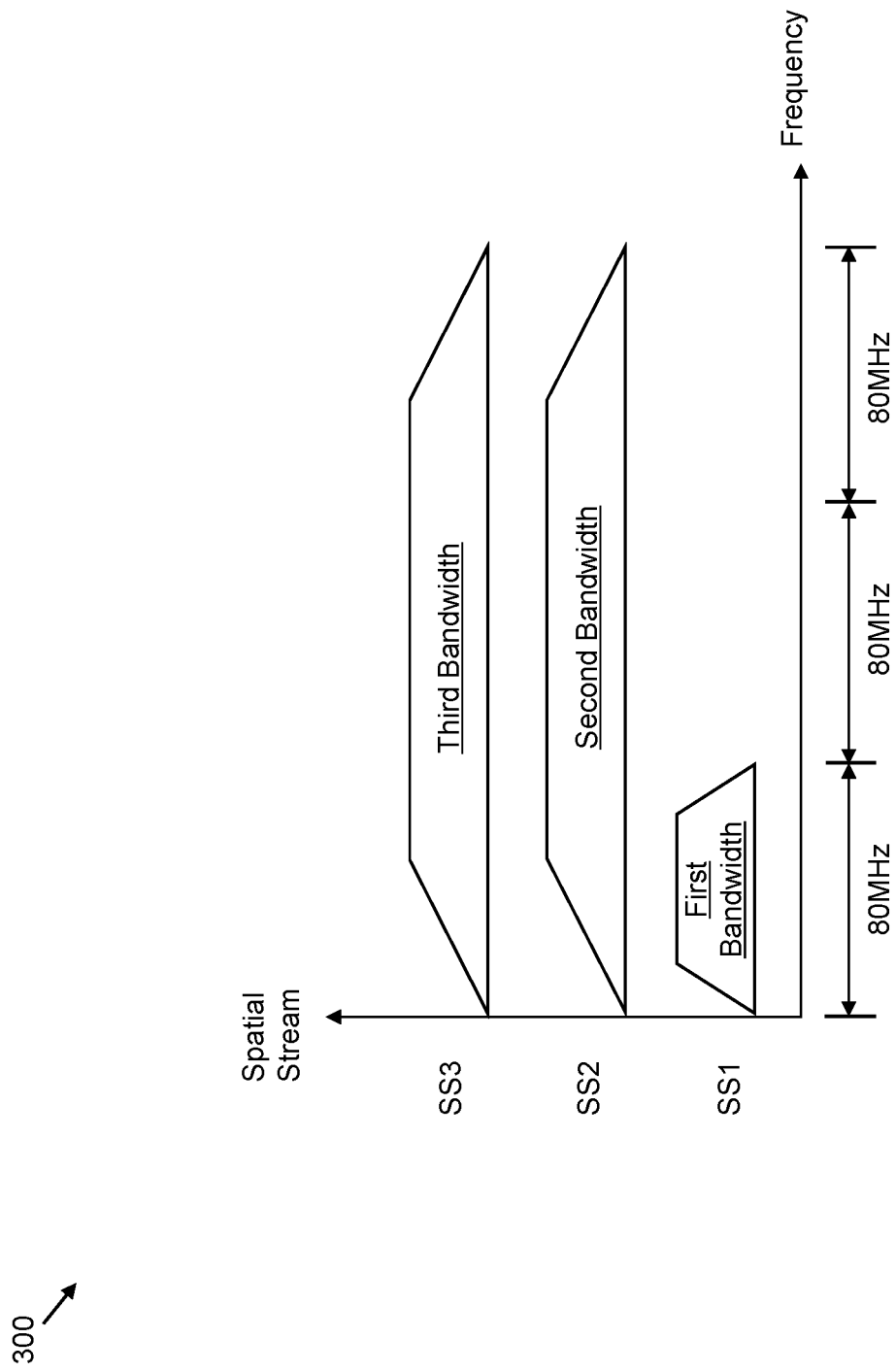
FIG. 3 is a pictorial representation of the bandwidth and the one or more spatial streams assigned to each station of the plurality of stations of the wireless network of FIG. 1 for the MU-MIMO communication in accordance with another embodiment of the present disclosure.

FIG. 3 is a pictorial representation 300 of the bandwidth and the one or more spatial streams assigned to each station of the plurality of stations 104 for the MU-MIMO communication in accordance with another embodiment of the present disclosure. It is assumed that the available bandwidth of the networking device 102 is 240 MHz. Further, the available bandwidth of the first station 104a is 80 MHz, and the available bandwidth of each of the second and third stations 104b and 104c is 240 MHz. As illustrated in FIG. 3, the first bandwidth assigned to the first station 104a is equal to 80 MHz (e.g., the entire available bandwidth of the first station 104a). Similarly, the second bandwidth assigned to the second station 104b is equal to 240 MHz and the third bandwidth assigned to the third station 104c is equal to 240 MHz. As the bandwidths assigned to the first through third stations 104a-104c overlap (e.g., partially or completely), a separate spatial stream is assigned to each of the first through third stations 104a-104c. In other words, the first through third spatial streams are different and are illustrated as "SS1", "SS2", and "SS3" in FIG. 3, respectively. Thus, a total of 560 MHz bandwidth is utilized for the MU-MIMO communication between the networking device 102 and the first through third stations 104a-104c.

As per some conventional MU-MIMO techniques, the first station 104a may be assigned the initial 80 MHz bandwidth, whereas each of the second and third stations 104b and 104c may be assigned the remaining 160 MHz bandwidth. Thus, the remaining available bandwidth of each of the second and third stations 104b and 104c is not utilized. In such a scenario, a total of 400 MHz bandwidth is utilized for the MU-MIMO communication between the networking device 102 and the first through third stations 104a-104c. Thus, the throughput of wireless network 100 is significantly greater than that of the wireless network implementing some conventional MU-MIMO techniques.

Figure 4:
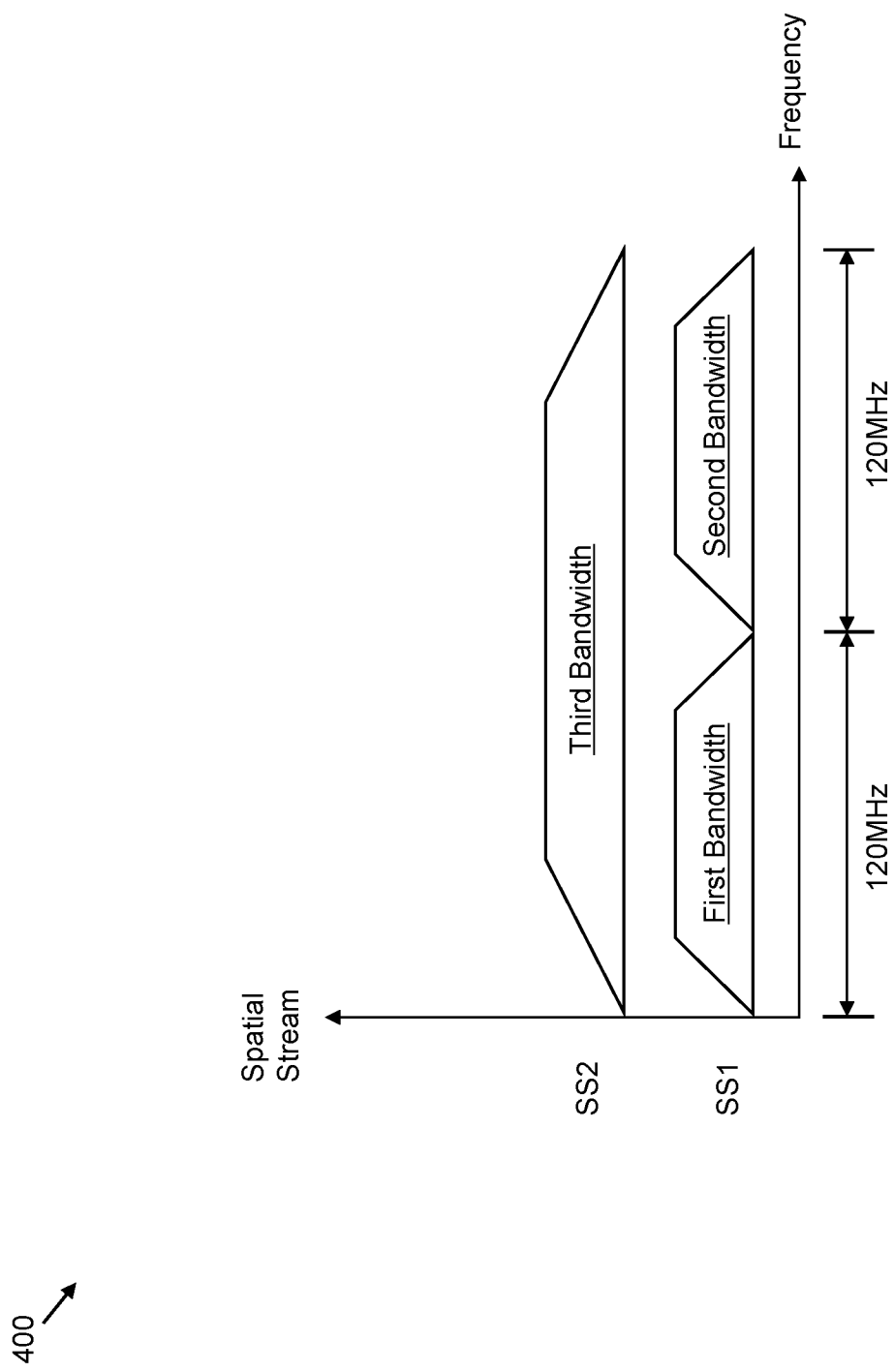
FIG. 4 is a pictorial representation of the bandwidth and the one or more spatial streams assigned to each station of the plurality of stations of the wireless network of FIG. 1 for the MU-MIMO communication in accordance with yet another embodiment of the present disclosure.

FIG. 4 is a pictorial representation 400 of the bandwidth and the one or more spatial streams assigned to each station of the plurality of stations 104 for the MU-MIMO communication in accordance with yet another embodiment of the present disclosure. It is assumed that the available bandwidth of the networking device 102 is 240 MHz. Further, the available bandwidth of the first station 104a is equal to 120 MHz and the available bandwidth of the second station 104b is equal to 120 MHz. However, the available bandwidth of the first station 104a is the initial (e.g., the primary) 120 MHz of the total 240 MHz bandwidth of the networking device 102, and the available bandwidth of the second station 104b is the next (e.g., the secondary) 120 MHz of the total 240 MHz bandwidth of the networking device 102. On the other hand, the available bandwidth of the third station 104c is 240 MHz.

As illustrated in FIG. 4, the first bandwidth assigned to the first station 104a is equal to the initial 120 MHz of the total 240 MHz bandwidth of the networking device 102, whereas the second bandwidth assigned to the second station 104b is equal to the next 120 MHz of the total 240 MHz bandwidth of the networking device 102. Further, the third bandwidth assigned to the third station 104c is equal to 240 MHz. As the first bandwidth and the second bandwidth are mutually exclusive, a spatial stream is shared between the first and second stations 104a and 104b. In other words, the first and second spatial streams are same (illustrated as "SS1" in FIG. 4). Further, as the bandwidth assigned to the third station 104c overlaps with that assigned to the first and second stations 104a and 104b, a separate spatial stream is assigned to the third station 104c. In other words, the third spatial stream is different from the first and second spatial streams, and is illustrated as "SS2" in FIG. 4. Thus, a total of 480 MHz bandwidth is utilized for the MU-MIMO communication between the networking device 102 and the first through third stations 104a-104c.

As per some conventional MU-MIMO techniques, the first station 104a may be assigned the initial 120 MHz bandwidth, whereas each of the second and third stations 104b and 104c may be assigned the remaining 120 MHz bandwidth. Thus, the remaining available bandwidth of the third station 104c is not utilized. In such a scenario, a total of 360 MHz bandwidth is utilized for the MU-MIMO communication between the networking device 102 and the first through third stations 104a-104c. Hence, the throughput of wireless network 100 is significantly greater than that of the wireless network implementing some conventional MU-MIMO techniques.

Figure 5:
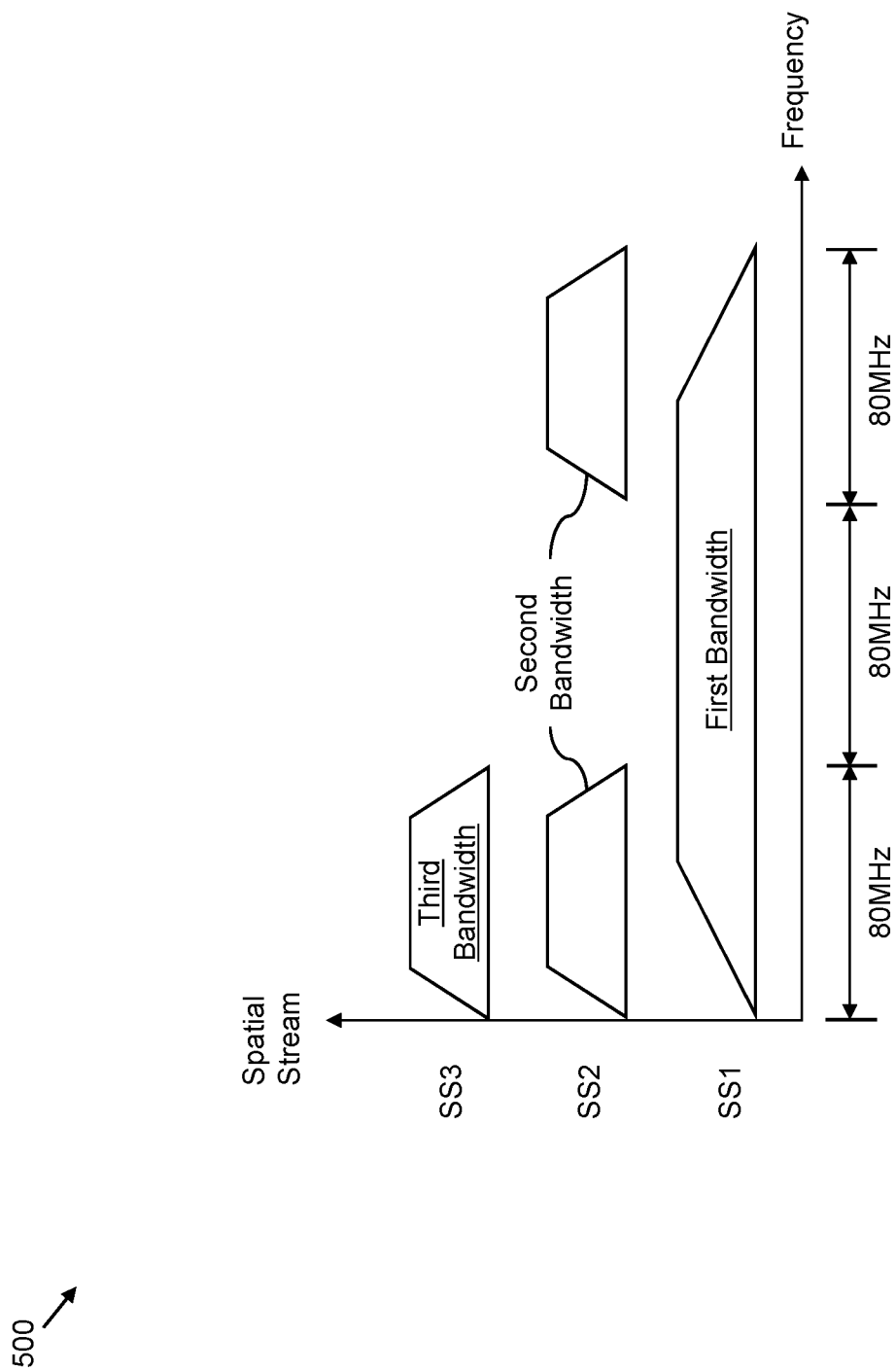
FIG. 5 is a pictorial representation of the bandwidth and the one or more spatial streams assigned to each station of the plurality of stations of the wireless network of FIG. 1 for the MU-MIMO communication in accordance with yet another embodiment of the present disclosure.

FIG. 5 is a pictorial representation 500 of the bandwidth and the one or more spatial streams assigned to each station of the plurality of stations 104 for the MU-MIMO communication in accordance with yet another embodiment of the present disclosure. It is assumed that the available bandwidth of the networking device 102 is 240 MHz, and the available bandwidth of the first station 104a is 240 MHz. Further, the available bandwidth of the second station 104b is 160 MHz that is split into two parts. In other words, the available bandwidth of the second station 104b is the initial 80 MHz and the last 80 MHz of the total 240 MHz bandwidth of the networking device 102. The middle 80 MHz of the total 240 MHz bandwidth of the networking device 102 is unavailable for the MU-MIMO communication with the second station 104b. On the other hand, the available bandwidth of the third station 104c is the initial 80 MHz of the total 240 MHz bandwidth of the networking device 102.

As illustrated in FIG. 5, the first bandwidth assigned to the first station 104a is equal to 240 MHz. Further, the second bandwidth assigned to the second station 104b is split into two parts, the first part corresponding to the initial 80 MHz of the total 240 MHz bandwidth of the networking device 102 and the second part corresponding to the last 80 MHz of the total 240 MHz bandwidth of the networking device 102. In other words, the second bandwidth is punctured. Thus, the second bandwidth assigned to the second station 104b is non-contiguous. Further, the third bandwidth assigned to the third station 104c is equal to the initial 80 MHz of the total 240 MHz bandwidth of the networking device 102. As the bandwidths assigned to the first through third stations 104a-104c are different and partially overlap, a separate spatial stream is assigned to each of the first through third stations 104a-104c. In other words, the first through third spatial streams are different and are illustrated as "SS1", "SS2", and "SS3" in FIG. 5, respectively. Thus, a total of 480 MHz bandwidth is utilized for the MU-MIMO communication between the networking device 102 and the first through third stations 104a-104c.

As per some conventional MU-MIMO techniques, each of the first through third stations 104a-104c may be assigned the initial 80 MHz bandwidth, with remaining available bandwidths of the first and second stations 104a and 104b not being utilized. In such a scenario, a total of 240 MHz bandwidth is utilized for the MU-MIMO communication between the networking device 102 and the first through third stations 104a-104c. Thus, the throughput of wireless network 100 is significantly greater than that of the wireless network implementing some conventional MU-MIMO techniques.

FIGS. 2, 3, 4, and 5 illustrate a few ways of enabling the MU-MIMO communication between the networking device 102 and the plurality of stations 104. However, these illustrations are not exhaustive and should not be considered as a limitation of the present disclosure. In various other embodiments, the MU-MIMO communication may be enabled between the networking device 102 and the plurality of stations 104 in different ways, without deviating from the scope of the present disclosure.

Figure 6:
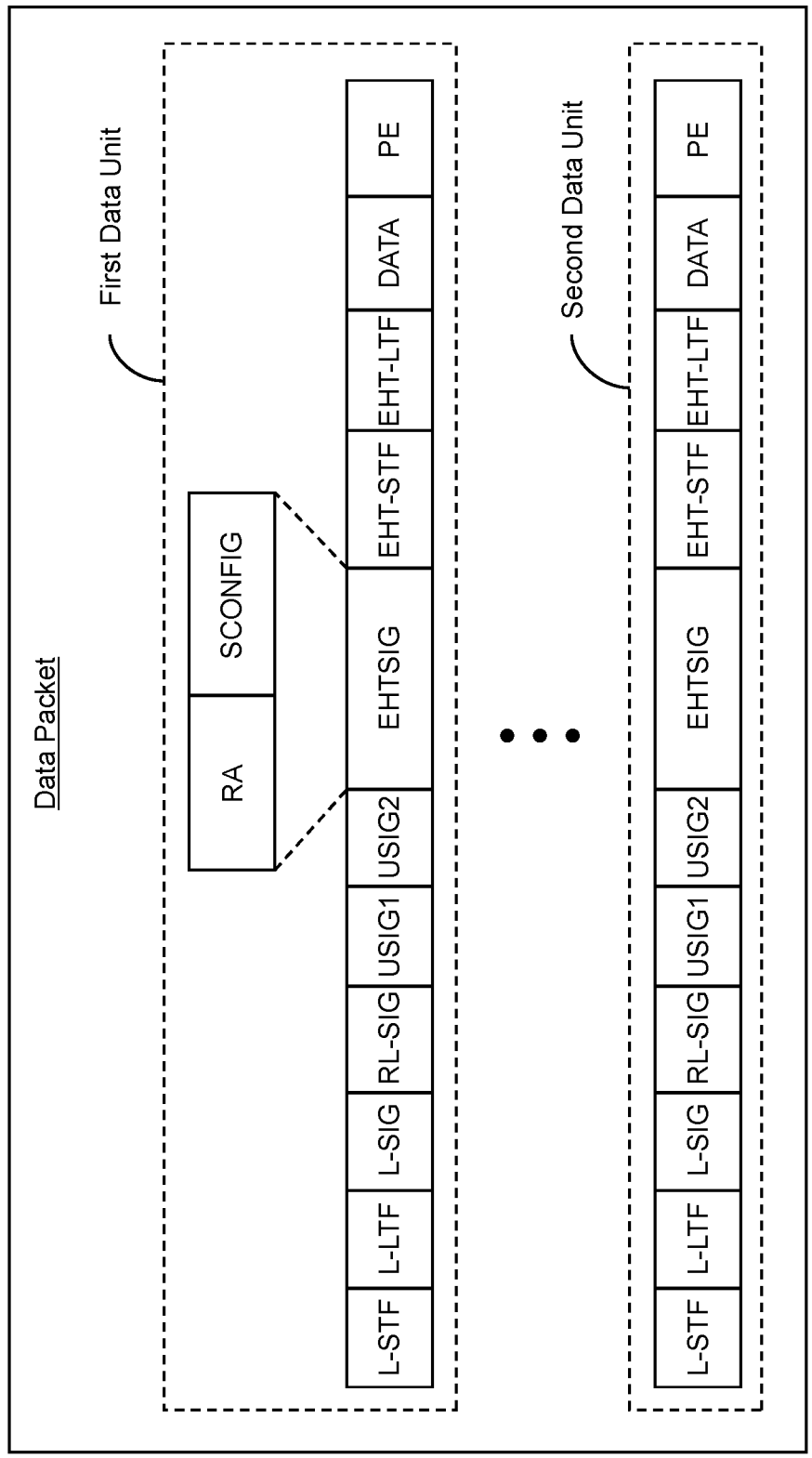
FIG. 6 is a schematic diagram that illustrates a data packet generated for enabling the MU-MIMO communication in the wireless network of FIG. 1 in accordance with an embodiment of the present disclosure.

FIG. 6 is a schematic diagram that illustrates the data packet generated for enabling the MU-MIMO communication in the wireless network 100 in accordance with an embodiment of the present disclosure. A frame format of the data packet corresponds to an extremely high throughput downlink orthogonal frequency division multiple access physical layer protocol data unit (EHT DL-OFDMA PPDU) frame format. The data packet may include a plurality of data units of which a first data unit and a second data unit are shown. The first and second data units may correspond to the initial and last data units of the data packet, respectively.

The available bandwidth of the networking device 102 may be divided into the plurality of frequency bands and each frequency band may be assigned to one or more stations of the plurality of stations 104. In an example, each frequency band of the plurality of frequency bands is equal to 20 MHz. Thus, if the available bandwidth of the networking device 102 is 240 MHz, the available bandwidth may be divided into 12 frequency bands of 20 MHz each. In such a scenario, assigning 80 MHz to one station corresponds to assigning four frequency bands to the corresponding station.

Each data unit of the plurality of data units is associated with a frequency band of the plurality of frequency bands. Further, each data unit of the plurality of data units is indicative of the assignment of the corresponding frequency band and associated spatial streams to one or more stations of the plurality of stations 104. The first data unit may thus be associated with a first frequency band (e.g., the initial 20 MHz bandwidth) of the available bandwidth of the networking device 102. Further, the first data unit may be indicative of the assignment of the first frequency band and associated spatial streams to various stations of the plurality of stations 104.

The first data unit may include a legacy short training field (shown as "L-STF" in FIG. 6), a legacy long training field (shown as "L-LTF" in FIG. 6), and a legacy signal field (shown as "L-SIG" in FIG. 6). The legacy short training field, the legacy long training field, and the legacy signal field may correspond to a legacy preamble of the first data unit. The legacy preamble facilitates backward compatibility and coexistence with the legacy networking devices. The first data unit may further include a repeated signal field (shown as "RL-SIG" in FIG. 6) that is a repeat of the legacy signal field and is used to differentiate an extremely high throughput (EHT) physical layer protocol data unit (PPDU) from a high throughput (HT) PPDU, a non-HT PPDU, and a very high throughput (VHT) PPDU.

The first data unit may further include a first universal signal field (shown as "USIG1" in FIG. 6) and a second universal field (shown as "USIG2" in FIG. 6). The first and second universal signal fields carry information necessary to interpret EHT PPDUs. For example, a 'B6' bit of the first universal signal field indicates whether the PPDU is an uplink PPDU or a downlink PPDU. The 'B6' bit of the first universal signal field having a logic low state (e.g., "0") indicates that the PPDU is a downlink PPDU. Conversely, the 'B6' bit of the first universal signal field having a logic high state (e.g., "1") indicates that the PPDU is an uplink PPDU. Similarly, 'B0' and 'B1' bits of the second universal signal field are indicative of PPDU type and compression mode. When the 'B6' bit has a logic low state, the 'B0' and 'B1' bits having a logic low state indicate a downlink orthogonal frequency division multiple access (DL-OFDMA) transmission. Similarly, the 'B0' and 'B1' bits having a logic low state and a logic high state, respectively, indicate a non-OFDMA DL transmission. Further, the 'B0' and 'B1' bits having a logic high state and a logic low state, respectively, indicate a transmission to a single user. Conversely, when the 'B6' bit has a logic high state, the 'B0' and 'B1' bits having a logic low state indicate an EHT trigger-based (TB) PPDU transmission, whereas the 'B0' and 'B1' bits having a logic high state and a logic low state, respectively, indicate transmission of a null data packet (NDP) to the networking device 102.

To enable the MU-MIMO communication with the first through third stations 104a-104c, the processing circuit 110 generates the data packet such that the 'B6' bit of the first universal signal field and the 'B0' and 'B1' bits of the second universal signal field have a logic low state. Thus, the first and second universal signal fields indicate that the first data unit is a DL-OFDMA PPDU. The legacy preamble, the repeated signal field, the first universal signal field, and the second universal signal field are repeated for each data unit of the plurality of data units.

The first data unit may further include an EHT signal field (shown as "EHTSIG" in FIG. 6). The EHT signal field may include a resource allocation subfield (shown as "RA" in FIG. 6) and a spatial configuration subfield (shown as "SCONFIG" in FIG. 6).

The resource allocation subfield is indicative of the bandwidth assigned to each station of the plurality of stations 104 and a number of stations of the plurality of stations 104. In an example, the resource allocation subfield may include a mapping between an identifier of each station of the plurality of stations 104 and the bandwidth assigned to the corresponding station. The resource allocation subfield remains same for each data unit of the plurality of data units. Various unused values of the EHT signal field may be utilized for defining the resource allocation subfield.

The spatial configuration subfield is indicative of the one or more spatial streams assigned to each station of the one or more stations in the corresponding frequency band. In other words, the spatial configuration subfield of the first data unit indicates various spatial streams assigned to various stations in the corresponding 20 MHz frequency band. For example, as illustrated in FIG. 2, the initial 20 MHz frequency band is shared by the first through third stations 104a-104c. In such a scenario, the spatial configuration subfield of the first data unit may be indicative of the first through third spatial streams that are assigned to the first through third stations 104a-104c in the first frequency band. In the same illustration, the last 20 MHz frequency band is assigned exclusively to the first station 104a. Thus, the spatial configuration subfield of the second data unit may be indicative of the first spatial stream that is assigned to the first station 104a in the last frequency band. The spatial configuration subfield may further indicate a type of encoding scheme used for the data packet. The spatial configuration subfield may include various user information subfields indicative of the assigned spatial streams of the corresponding users (e.g., the first through third stations 104a-104c).

The first data unit may further include an EHT short training field (shown as "EHT-STF" in FIG. 6) and an EHT long training field (shown as "EHT-LTF" in FIG. 6). The main purpose of the EHT short training field is to improve automatic gain control estimation in MU-MIMO communication. On the other hand, the EHT long training field provides a means for a receiver (e.g., the plurality of stations 104) to estimate the channel between the networking device 102 and the plurality of stations 104. The legacy preamble, the repeated signal field, the first universal signal field, the second universal signal field, the EHT signal field, the EHT short training field, and the EHT long training field correspond to the control fields of the data packet.

The first data unit may further include a data field. The data field of the first data unit may include one or more data sets for various stations in the associated frequency band. The first data unit may further include a packet extension (PE) field that may be appended to the end of the first data unit to provide the receiver (e.g., the first through third stations 104a-104c) with additional processing time at the end of reception of the data packet. The structure of the remaining data units of the data packets (including the second data unit) is similar to that described above.

Although it is described that the frame format of the data packet corresponds to an EHT DL-OFDMA PPDU frame format, the scope of the present disclosure is not limited to it. In various other embodiments, the MU-MIMO communication may be enabled between the networking device 102 and the plurality of stations 104 by using other frame formats, without deviating from the scope of the present disclosure.

Figure 7A:
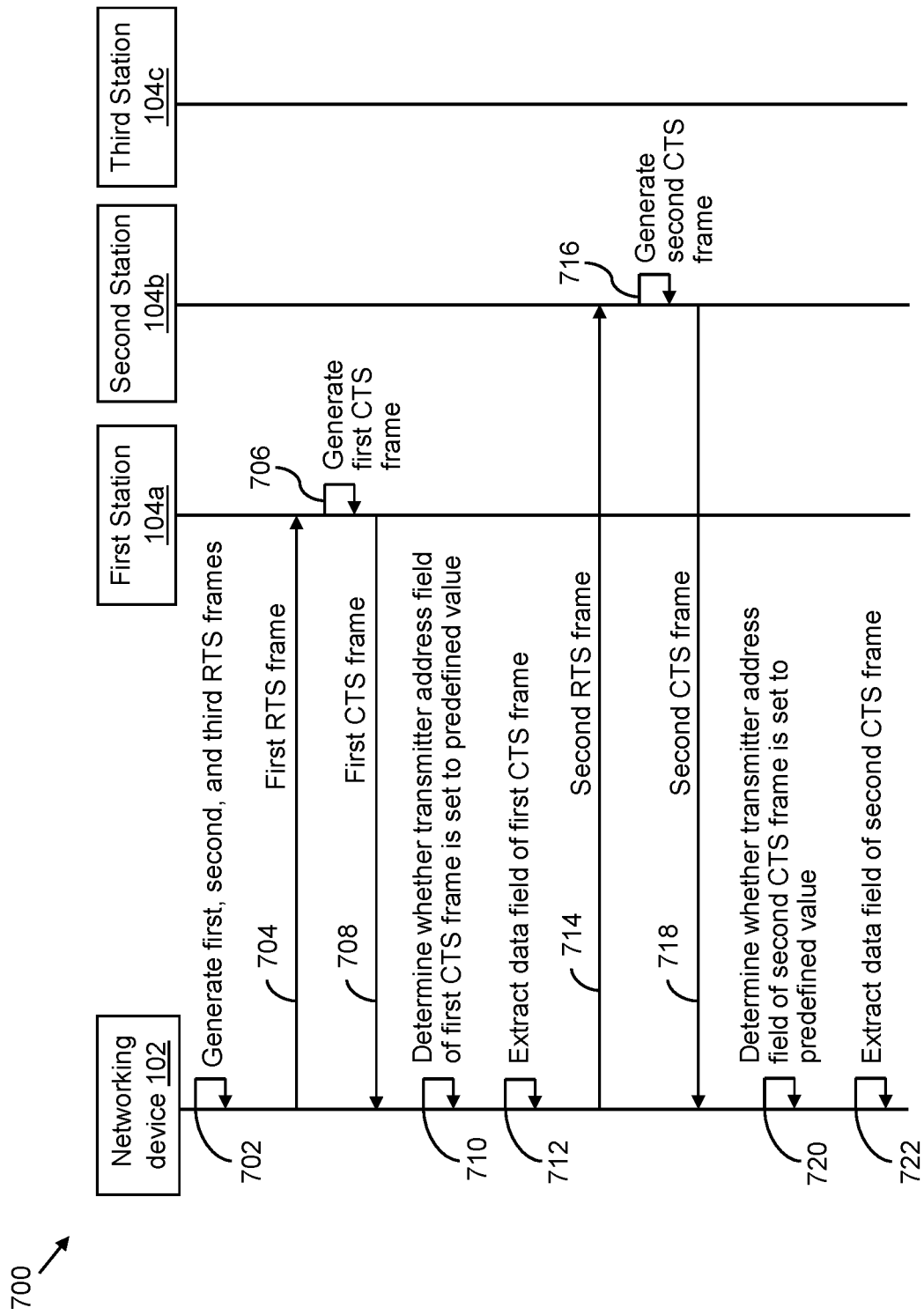
FIGS. 7A-7C, collectively, represents a sequence diagram that illustrates the MU-MIMO communication enabled between a networking device of the wireless network of FIG. 1 and the plurality of stations of the wireless network of FIG. 1 in accordance with an embodiment of the present disclosure.
Figure 7B:
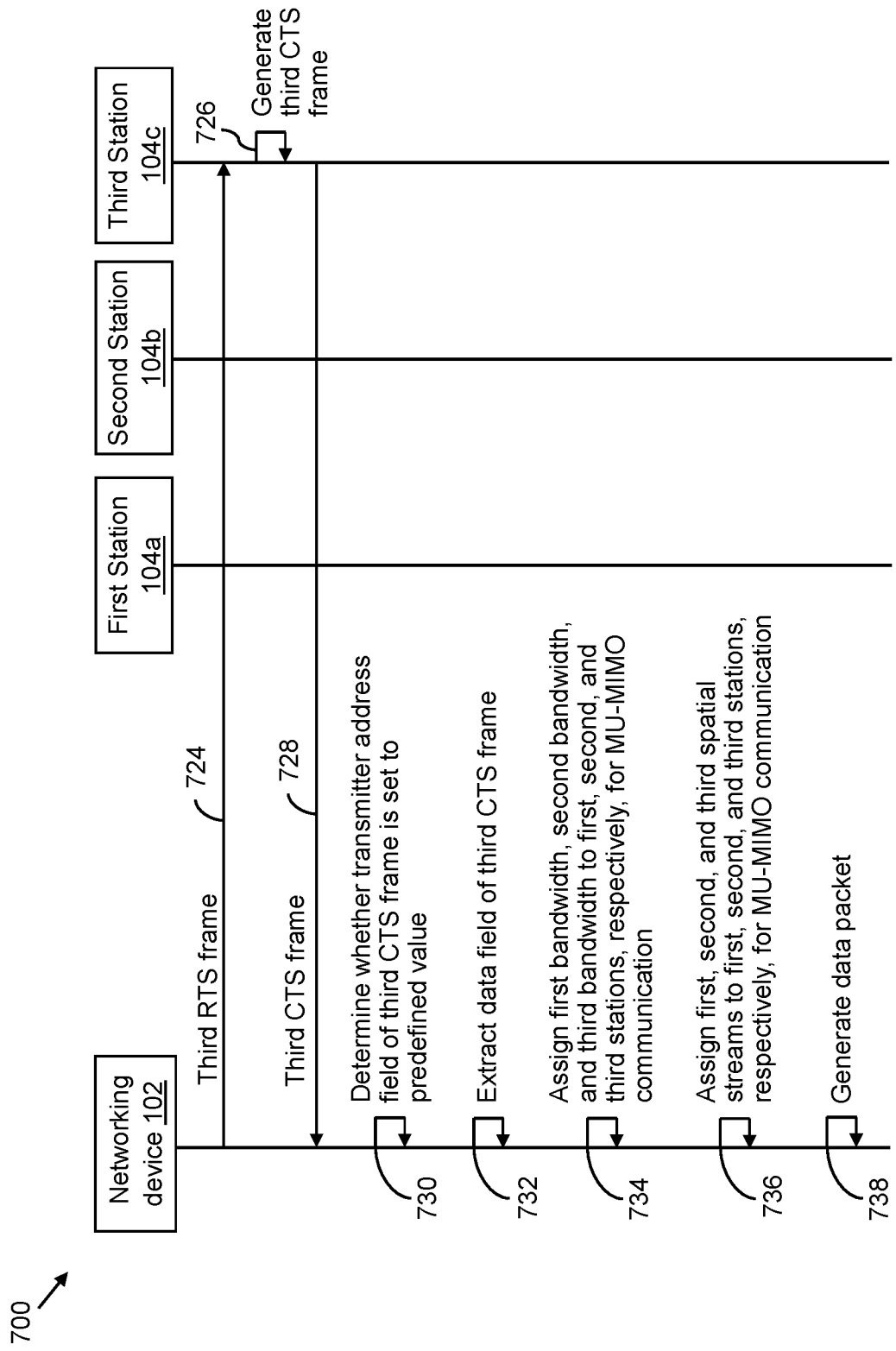
Figure 7C:
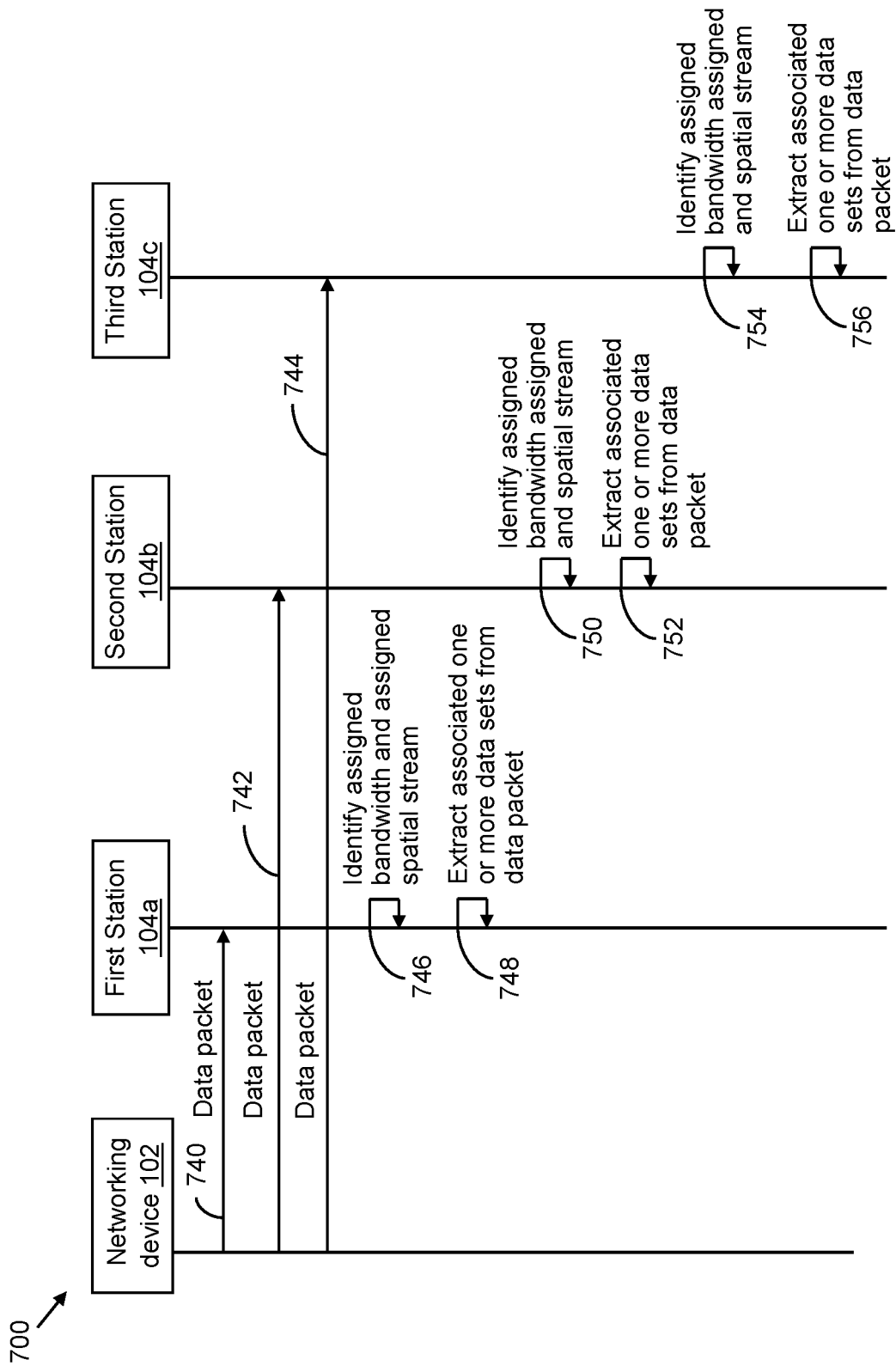

FIGS. 7A-7C, collectively, represents a sequence diagram 700 that illustrates the MU-MIMO communication enabled between the networking device 102 and the plurality of stations 104 in accordance with an embodiment of the present disclosure. Referring now to FIG. 7A, the networking device 102 may generate the first, second, and third RTS frames (as shown by arrow 702). Each of the first through third RTS frames includes the transmitter address field set to the predefined value and the data field indicative of the available bandwidth of the networking device 102.

Determining the Available Bandwidth of the First Station 104a:

The networking device 102 may transmit the first RTS frame to the first station 104a (as shown by arrow 704). Based on the first RTS frame, the first station 104a may generate the first CTS frame (as shown by arrow 706). The first CTS frame includes the transmitter address field that is set to the predefined value and the data field indicative of the available bandwidth of the first station 104a. The first station 104a may transmit the first CTS frame to the networking device 102 (as shown by arrow 708). The networking device 102 may determine whether the transmitter address field of the first CTS frame is set to the predefined value (as shown by arrow 710). As the transmitter address field of the first CTS frame is set to the predefined value, the networking device 102 may extract the data field of the first CTS frame (as shown by arrow 712). The networking device 102 thus determines the available bandwidth of the first station 104a.

Determining the Available Bandwidth of the Second Station 104b:

The networking device 102 may transmit the second RTS frame to the second station 104b (as shown by arrow 714). The second station 104b may generate the second CTS frame as a response to the second RTS frame (as shown by arrow 716). The second CTS frame includes the transmitter address field that is set to the predefined value and the data field indicative of the available bandwidth of the second station 104b. The second station 104b may transmit the second CTS frame to the networking device 102 (as shown by arrow 718). The networking device 102 may determine whether the transmitter address field of the second CTS frame is set to the predefined value (as shown by arrow 720). As the transmitter address field of the second CTS frame is set to the predefined value, the networking device 102 may extract the data field of the second CTS frame (as shown by arrow 722). The networking device 102 thus determines the available bandwidth of the second station 104b.

Determining the Available Bandwidth of the Third Station 104c:

Referring now to FIG. 7B, the networking device 102 may transmit the third RTS frame to the third station 104c (as shown by arrow 724). The third station 104c may generate the third CTS frame as a response to the third RTS frame (as shown by arrow 726). The third CTS frame includes the transmitter address field that is set to the predefined value and the data field indicative of the available bandwidth of the third station 104c. The third station 104c may transmit the third CTS frame to the networking device 102 (as shown by arrow 728). The networking device 102 may determine whether the transmitter address field of the third CTS frame is set to the predefined value (as shown by arrow 730). As the transmitter address field of the third CTS frame is set to the predefined value, the networking device 102 may extract the data field of the third CTS frame (as shown by arrow 732). The networking device 102 thus determines the available bandwidth of the third station 104c.

Assigning Bandwidth and Spatial Stream to Each Station:

Based on the determined available bandwidth, the networking device 102 may assign the first bandwidth, the second bandwidth, and the third bandwidth to the first through third stations 104a-104c, respectively, for the MU-MIMO communication (as shown by arrow 734). The first bandwidth may be less than or equal to the available bandwidth of the first station 104a. Similarly, the second bandwidth may be less than or equal to the available bandwidth of the second station 104b, and the third bandwidth may be less than or equal to the available bandwidth of the third station 104c. Further, the first bandwidth, the second bandwidth, and the third bandwidth may be different. Additionally, the first bandwidth, the second bandwidth, and the third bandwidth may be less than or equal to the available bandwidth of the networking device 102. The networking device 102 may further assign the first, second, and third spatial streams to the first, second, and third stations 104a-104c, respectively, for the MU-MIMO communication (as shown by arrow 736). In an example, the first bandwidth, the second bandwidth, and the third bandwidth may be different and may partially overlap. In such a scenario, a separate spatial stream is assigned to each of the first through third stations 104a-104c. In other words, the first through third spatial streams are different.

Data Packet:

The networking device 102 may generate the data packet (as shown by arrow 738). The data packet is indicative of the bandwidth and the spatial stream to each station of the plurality of stations 104. Referring now to FIG. 7C, the networking device 102 may transmit the data packet to the first through third stations 104a-104c (as shown by arrows 740, 742, and 744, respectively).

Based on the data packet, the first station 104a may identify the bandwidth (e.g., the first bandwidth) and the spatial stream (e.g., the first spatial stream) assigned to the first station 104a (as shown by arrow 746). The first station 104a may monitor one frequency band of the plurality of frequency bands. The first station 104a may identify the bandwidth assigned thereto based on the information stored in the resource allocation subfield of a data unit associated with the frequency band that the first station 104a is monitoring. The first station 104a may additionally identify, based on the information stored in the resource allocation subfield, the bandwidth assigned to various other stations that are a part of the MU-MIMO communication. The bandwidth assigned to the first station 104a may be associated with various data units of the data packet. The first station 104a may identify the spatial stream assigned thereto based on the information stored in the spatial configuration subfields of such data units. The first station 104a may additionally identify, based on the information stored in the spatial configuration subfields, the spatial streams assigned to various other stations that are a part of the MU-MIMO communication. The first station 104a may extract the associated one or more data sets from the data packet based on the bandwidth (e.g., the first bandwidth) and the spatial stream (e.g., the first spatial stream) assigned to the first station 104a (as shown by arrow 748).

The second station 104b may identify, based on the data packet, the bandwidth (e.g., the second bandwidth) and the spatial stream (e.g., the second spatial stream) assigned to the second station 104b (as shown by arrow 750). The second station 104b may extract the associated one or more data sets from the data packet based on the bandwidth and the spatial stream assigned to the second station 104b (as shown by arrow 752).

The third station 104c may identify, based on the data packet, the bandwidth (e.g., the third bandwidth) and the spatial stream (e.g., the third spatial stream) assigned to the third station 104c (as shown by arrow 754). The third station 104c may extract the associated one or more data sets from the data packet based on the bandwidth and the spatial stream assigned to the third station 104c (as shown by arrow 756). The MU-MIMO communication is thus enabled between the networking device 102 and the first through third stations 104a-104c. In other words, the networking device 102 communicates with the first through third stations 104a-104c simultaneously.

Figure 8A:
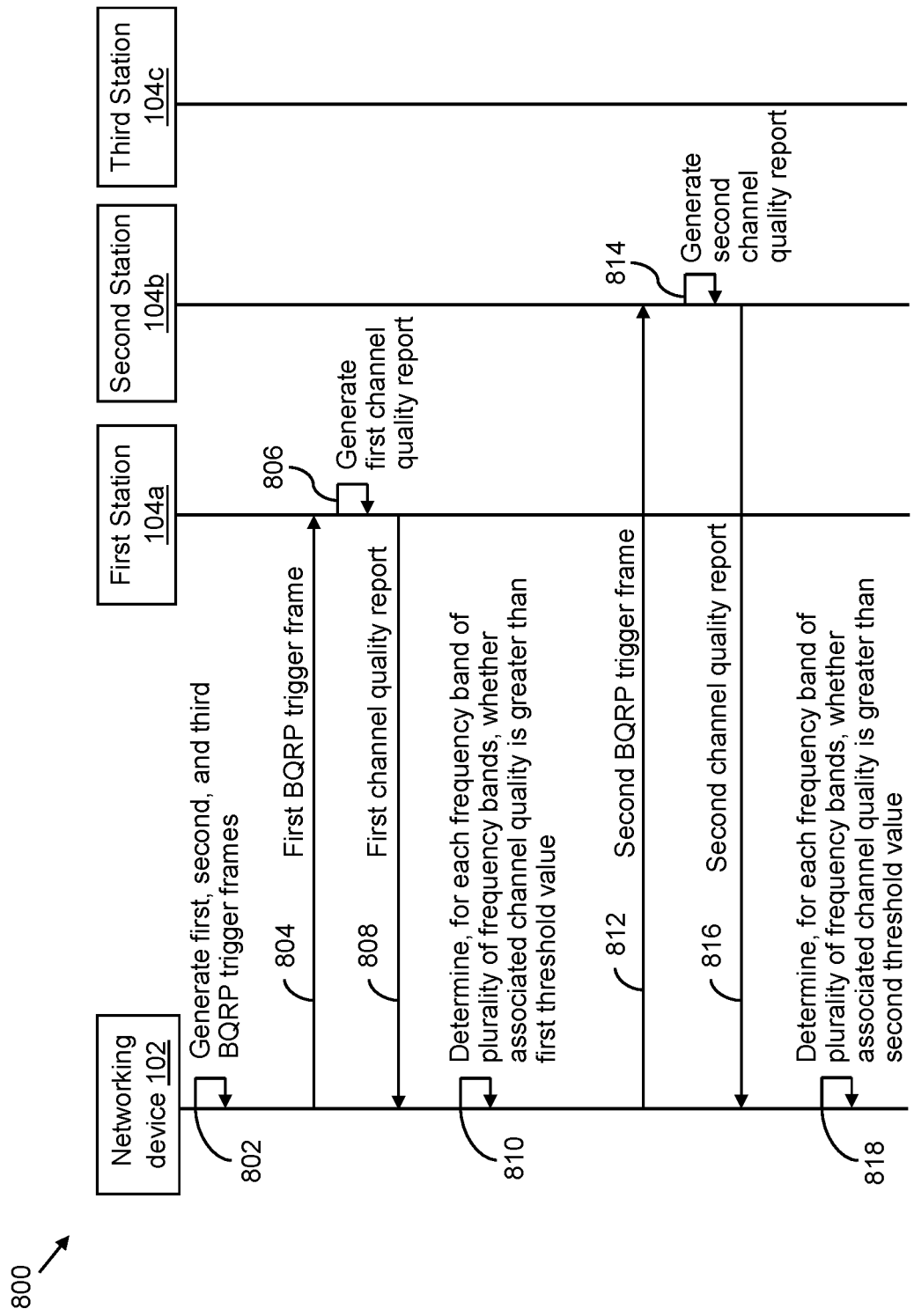
FIGS. 8A-8C, collectively, represents a sequence diagram that illustrates the MU-MIMO communication enabled between the networking device of the wireless network of FIG. 1 and the plurality of stations of the wireless network of FIG. 1 in accordance with another embodiment of the present disclosure.
Figure 8B:
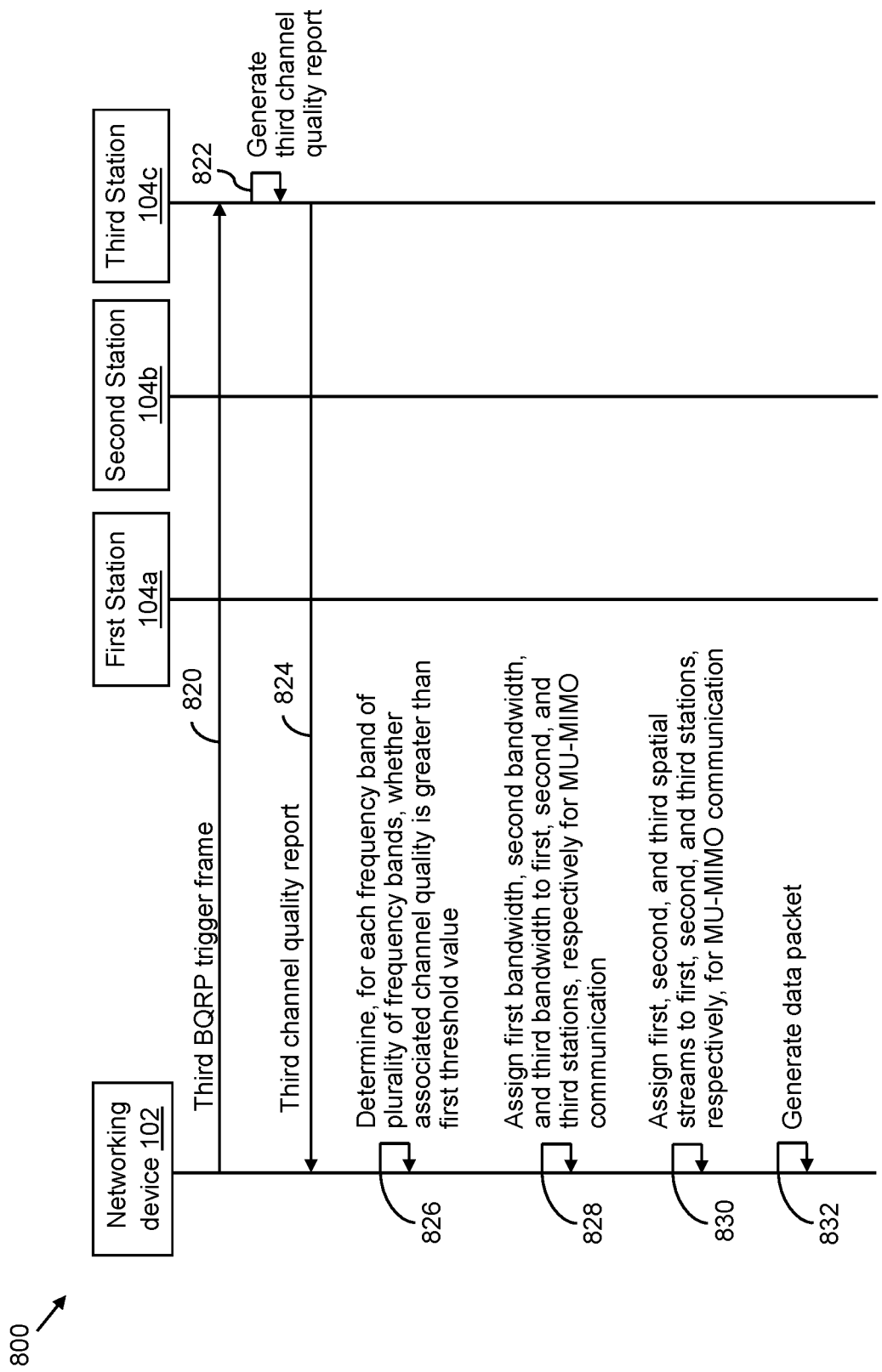
Figure 8C:
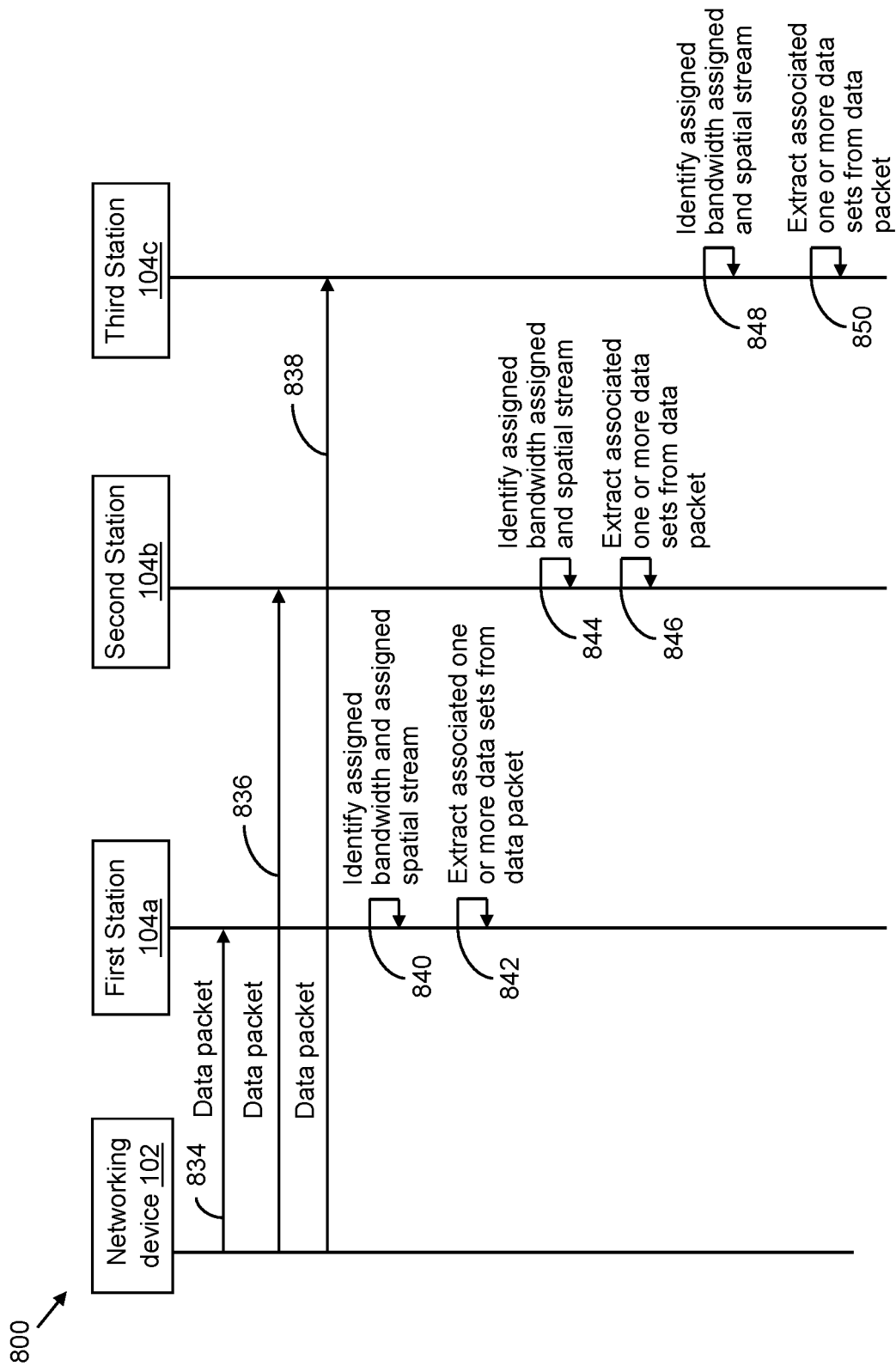

FIGS. 8A-8C, collectively, represents a sequence diagram 800 that illustrates the MU-MIMO communication enabled between the networking device 102 and the plurality of stations 104 in accordance with another embodiment of the present disclosure. Referring now to FIG. 8A, the networking device 102 may generate the first, second, and third BQRP trigger frames (as shown by arrow 802). Determining the available bandwidth of the first station 104a:

The networking device 102 may transmit the first BQRP trigger frame to the first station 104a (as shown by arrow 804). Based on the first BQRP trigger frame, the first station 104a may generate the first channel quality report (as shown by arrow 806). The first station 104a may transmit the first channel quality report to the networking device 102 (as shown by arrow 808). The first channel quality report is indicative of the channel quality of each frequency band of the plurality of frequency bands between the first station 104a and the networking device 102. The networking device 102 may determine, for each frequency band of the plurality of frequency bands, whether the associated channel quality is greater than the first threshold value (as shown by arrow 810). In such a scenario, the available bandwidth of the first station 104a corresponds to various frequency bands of the plurality of frequency bands having the channel quality greater than the first threshold value.

Determining the Available Bandwidth of the Second Station 104b:

The networking device 102 may transmit the second BQRP trigger frame to the second station 104b (as shown by arrow 812). Based on the second BQRP trigger frame, the second station 104b may generate the second channel quality report (as shown by arrow 814). The second station 104b may transmit the second channel quality report to the networking device 102 (as shown by arrow 816). The second channel quality report is indicative of the channel quality of each frequency band of the plurality of frequency bands between the second station 104b and the networking device 102. The networking device 102 may determine, for each frequency band of the plurality of frequency bands, whether the associated channel quality is greater than the second threshold value (as shown by arrow 818). In such a scenario, the available bandwidth of the second station 104b corresponds to various frequency bands of the plurality of frequency bands having the channel quality greater than the second threshold value.

Determining the Available Bandwidth of the Third Station 104c:

Referring now to FIG. 8B, the networking device 102 may transmit the third BQRP trigger frame to the third station 104c (as shown by arrow 820). Based on the third BQRP trigger frame, the third station 104c may generate the third channel quality report (as shown by arrow 822). The third station 104c may transmit the third channel quality report to the networking device 102 (as shown by arrow 824). The third channel quality report is indicative of the channel quality of each frequency band of the plurality of frequency bands between the third station 104c and the networking device 102. The networking device 102 may determine, for each frequency band of the plurality of frequency bands, whether the associated channel quality is greater than the third threshold value (as shown by arrow 826). In such a scenario, the available bandwidth of the third station 104c corresponds to various frequency bands of the plurality of frequency bands having the channel quality greater than the third threshold value.

The operations illustrated by arrows 828, 830, 832, 834, 836, 838, 840, 842, 844, 846, 848, and 850 are same as the operations illustrated by arrows 734, 736, 738, 740, 742, 744, 746, 748, 750, 752, 754, and 756 in the sequence diagram 700, respectively.

Figure 9:
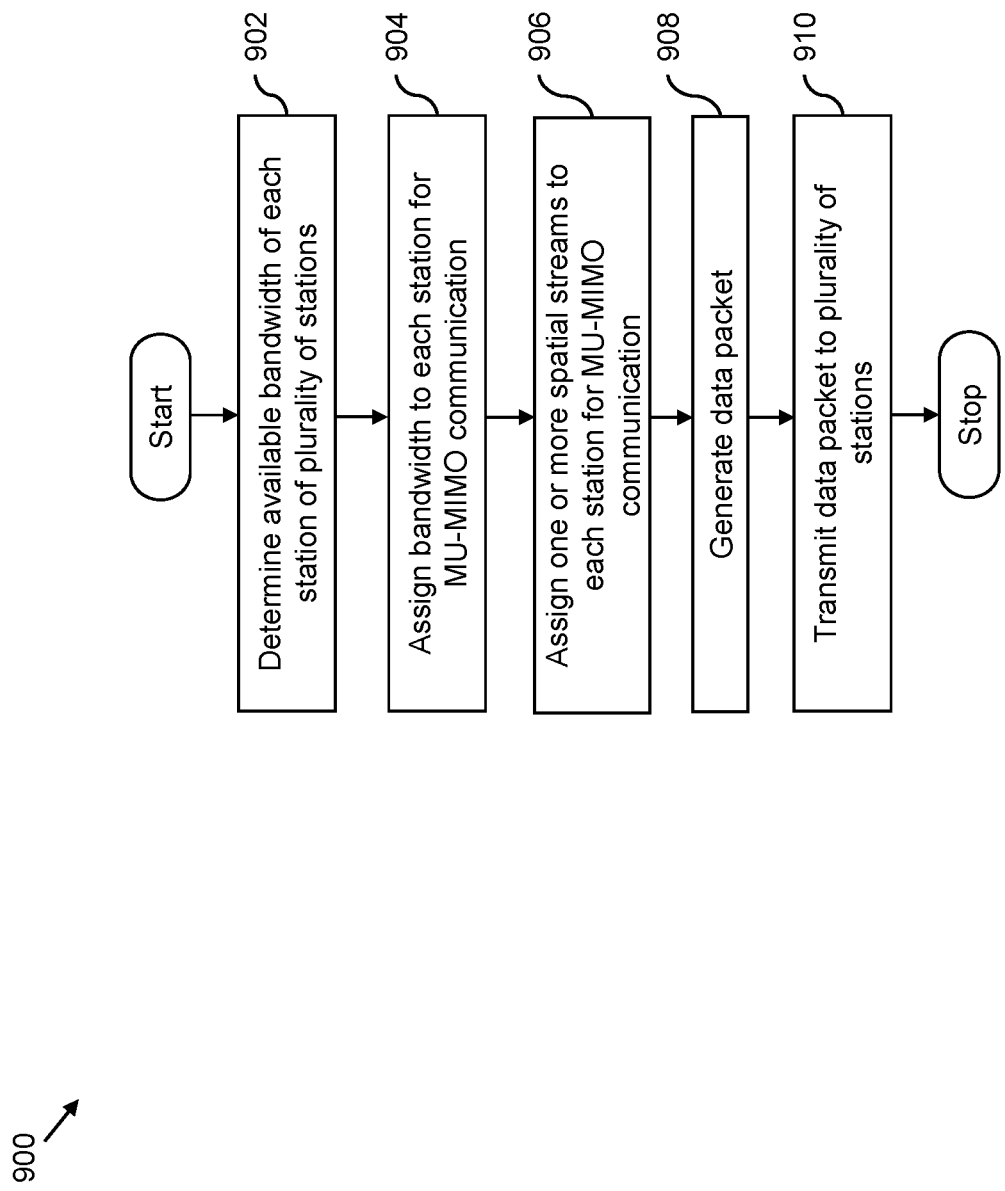
FIG. 9 represents a flowchart that illustrates a method for enabling the MU-MIMO communication in the wireless network of FIG. 1 in accordance with an embodiment of the present disclosure.

FIG. 9 represents a flowchart 900 that illustrates a method for enabling the MU-MIMO communication in the wireless network 100 in accordance with an embodiment of the present disclosure. The networking device 102 initiates the MU-MIMO communication. At step 902, the networking device 102 may determine the available bandwidth of each station of the plurality of stations 104. At step 904, the networking device 102 may assign a bandwidth to each station of the plurality of stations 104 for the MU-MIMO communication. For example, the networking device 102 may assign the first bandwidth, the second bandwidth, and the third bandwidth to the first through third stations 104a-104c, respectively. The first bandwidth may be less than or equal to the available bandwidth of the first station 104a. Similarly, the second bandwidth may be less than or equal to the available bandwidth of the second station 104b, and the third bandwidth may be less than or equal to the available bandwidth of the third station 104c. Further, the first bandwidth, the second bandwidth, and the third bandwidth may be different. Additionally, the first bandwidth, the second bandwidth, and the third bandwidth may be less than or equal to the available bandwidth of the networking device 102.

At step 906, the networking device 102 may assign one or more spatial streams to each station of the plurality of stations 104 for the MU-MIMO communication. For example, the networking device 102 may assign the first through third spatial streams to the first through third stations 104a-104c, respectively. In an example, the first bandwidth, the second bandwidth, and the third bandwidth may be different and may partially overlap. In such a scenario, a separate spatial stream is assigned to each of the first through third stations 104a-104c. In other words, the first through third spatial streams are different. Alternatively, one spatial stream may be shared by two stations of the plurality of stations 104. In such a scenario, the assigned bandwidths for the two stations are mutually exclusive and the sum of assigned bandwidths for the two stations is less than or equal to the available bandwidth of the networking device 102.

At step 908, the networking device 102 may generate the data packet. The data packet is indicative of the bandwidth and the one or more spatial streams assigned to each station of the plurality of stations 104. At step 910, the networking device 102 may transmit the data packet to the plurality of stations 104. Based on the information stored in the control fields of the received data packet, each station of the plurality of stations 104 extracts the associated one or more data sets from the data packet. The MU-MIMO communication is thus enabled between the networking device 102 and the plurality of stations 104 based on the data packet.

The networking device 102 thus communicates with the plurality of stations 104 simultaneously, thereby increasing the speed of data communication between the networking device 102 and the plurality of stations 104. Conventionally, to enable MU-MIMO communication between a networking device and various stations of a wireless network, each station is required to have the same available bandwidth. If the available bandwidth of each station is different, the spatial streams to the stations may be spatially multiplexed exclusively for the part of the bandwidth that is available for each station. In other words, the remaining available bandwidths of various stations may not be utilized for the MU-MIMO communication. As a result, the throughput of the wireless network significantly degrades. In the present disclosure, the MU-MIMO communication may be enabled for the plurality of stations 104 having different available bandwidths. In such embodiments, the bandwidth assigned to each station of the plurality of stations 104 is equal to the available bandwidth of the corresponding station. As a result, the entire available bandwidth of each station of the plurality of stations 104 is utilized for the MU-MIMO communication. Thus, the throughput of the wireless network 100 is significantly greater than that of a wireless network where some conventional MU-MIMO techniques are implemented.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A networking device of a wireless network, comprising:
a processing circuit configured to:
determine an available bandwidth of each station of a plurality of stations of the wireless network;
assign a bandwidth and one or more spatial streams to each station of the plurality of stations, wherein the bandwidth assigned to each station of the plurality of stations is less than or equal to the determined available bandwidth thereof, wherein the bandwidth assigned to a first station of the plurality of stations is different from and partially overlaps with the bandwidth assigned to a second station of the plurality of stations, and wherein the one or more spatial streams assigned to the first station are different from the one or more spatial streams assigned to the second station and the assigned spatial streams are based on the assigned partially overlapping bandwidths;
generate a data packet that is indicative of the bandwidth and the one or more spatial streams assigned to each station of the plurality of stations; and
transmit the data packet to the plurality of stations, wherein multi-user multiple-input-multiple-output (MU-MIMO) communication is enabled between the networking device and the plurality of stations in the wireless network based on the data packet.

2. The networking device of claim 1, further comprising a plurality of antennas that is coupled to the processing circuit, wherein the processing circuit transmits the data packet to the plurality of stations using the plurality of antennas, and wherein a number of spatial streams assigned to the plurality of stations is less than or equal to a number of antennas of the plurality of antennas.

3. The networking device of claim 1, wherein the bandwidth assigned to the first station and the bandwidth assigned to a third station of the plurality of stations for the MU-MIMO communication are mutually exclusive, and wherein the one or more spatial streams assigned to the first station and the one or more spatial streams assigned to the third station for the MU-MIMO communication are same.

4. The networking device of claim 1, wherein the bandwidth assigned to each station of the plurality of stations is less than or equal to an available bandwidth of the networking device.

5. The networking device of claim 1, wherein the bandwidth assigned to each station of the plurality of stations is contiguous.

6. The networking device of claim 1, wherein the bandwidth assigned to at least one station of the plurality of stations is non-contiguous.

7. The networking device of claim 1, wherein to determine the available bandwidth of the first station of the plurality of stations, the processing circuit is further configured to:
generate and transmit a request-to-send (RTS) frame to the first station, wherein a transmitter address field of the RTS frame is set to a predefined value and a data field of the RTS frame is indicative of an available bandwidth of the networking device;
receive, from the first station, a clear-to-send (CTS) frame as a response to the RTS frame;
determine whether a transmitter address field of the CTS frame is set to the predefined value; and
extract a data field of the CTS frame when the transmitter address field of the CTS frame is set to the predefined value, wherein the data field of the CTS frame is indicative of the available bandwidth of the first station.

8. The networking device of claim 7, wherein the RTS frame is one of a group consisting of a single-user RTS frame and a multi-user RTS frame.

9. The networking device of claim 1, wherein to determine the available bandwidth of the first station of the plurality of stations, the processing circuit is further configured to:
generate and transmit a bandwidth query report poll (BQRP) trigger frame to the first station;
receive, from the first station in response to the BQRP trigger frame, a channel quality report that is indicative of channel quality of each frequency band of a plurality of frequency bands between the first station and the networking device, wherein an available bandwidth of the networking device is divided into the plurality of frequency bands; and
determine, for each frequency band of the plurality of frequency bands, whether the associated channel quality is greater than a threshold value, wherein the available bandwidth of the first station corresponds to one or more frequency bands of the plurality of frequency bands having the channel quality greater than the threshold value.

10. The networking device of claim 1, wherein a frame format of the data packet corresponds to an extremely high throughput downlink orthogonal frequency division multiple access physical layer protocol data unit (EHT DL-OFDMA PPDU) frame format.

11. The networking device of claim 1, wherein an available bandwidth of the networking device is divided into a plurality of frequency bands, and wherein each frequency band of the plurality of frequency bands is assigned to one or more stations of the plurality of stations.

12. The networking device of claim 11, wherein the data packet comprises a plurality of data units associated with the plurality of frequency bands, respectively, wherein each data unit of the plurality of data units comprises a first universal signal field and a second universal signal field, and wherein the first universal signal field and the second universal signal field indicate that the corresponding data unit is a downlink orthogonal frequency division multiple access physical layer protocol data unit (DL-OFDMA PPDU).

13. The networking device of claim 12, wherein each data unit of the plurality of data units further comprises an extremely high throughput (EHT) signal field, wherein the EHT signal field comprises a resource allocation subfield that is indicative of the bandwidth assigned to each station of the plurality of stations and a number of stations of the plurality of stations, and wherein the resource allocation subfield remains same for each data unit of the plurality of data units.

14. The networking device of claim 12, wherein each data unit of the plurality of data units further comprises an extremely high throughput (EHT) signal field, wherein the EHT signal field comprises a spatial configuration subfield, and wherein the spatial configuration subfield of each data unit is indicative of the one or more spatial streams assigned to each station of the one or more stations in the corresponding frequency band.

15. The networking device of claim 12, wherein each data unit of the plurality of data units further comprises a data field, and wherein the data field of each data unit comprises at least one data set for each station of the one or more stations in the corresponding frequency band.

16. A method for enabling multi-user multiple-input-multiple-output (MU-MIMO) communication in a wireless network, the method comprising:
determining, by a networking device of the wireless network, an available bandwidth of each station of a plurality of stations of the wireless network;
assigning, by the networking device, for the MU-MIMO communication, a bandwidth and one or more spatial streams to each station of the plurality of stations, wherein the bandwidth assigned to each station of the plurality of stations is less than or equal to the determined available bandwidth thereof, wherein the bandwidth assigned to a first station of the plurality of stations is different from and partially overlaps with the bandwidth assigned to a second station of the plurality of stations, and wherein the one or more spatial streams assigned to the first station are different from the one or more spatial streams assigned to the second station and the assigned spatial streams are based on the assigned partially overlapping bandwidths;
generating, by the networking device, a data packet that is indicative of the bandwidth and the one or more spatial streams assigned to each station of the plurality of stations; and
transmitting, by the networking device, the data packet to the plurality of stations, wherein the MU-MIMO communication is enabled between the networking device and the plurality of stations in the wireless network based on the data packet.

17. The method of claim 16, wherein the bandwidth assigned to at least one station of the plurality of stations is non-contiguous.

18. The method of claim 16, wherein an available bandwidth of the networking device is divided into a plurality of frequency bands such that each frequency band of the plurality of frequency bands is assigned to one or more stations of the plurality of stations.

19. The method of claim 18, wherein the data packet comprises a plurality of data units associated with the plurality of frequency bands, respectively, wherein each data unit of the plurality of data units comprises a first universal signal field and a second universal signal field, and wherein the first universal signal field and the second universal signal field indicate that the corresponding data unit is a downlink orthogonal frequency division multiple access physical layer protocol data unit (DL-OFDMA PPDU).

20. The method of claim 19, wherein each data unit of the plurality of data units further comprises an extremely high throughput (EHT) signal field, wherein the EHT signal field comprises a resource allocation subfield and a spatial configuration subfield, wherein the resource allocation subfield is indicative of the bandwidth assigned to each station of the plurality of stations and a number of stations of the plurality of stations, and remains same for each data unit of the plurality of data units, and wherein the spatial configuration subfield of each data unit of the plurality of data units is indicative of the one or more spatial streams assigned to each station of the one or more stations in the corresponding frequency band.

\* \* \* \* \*